United States Patent
Pavia et al.

(10) Patent No.: US 10,899,970 B2
(45) Date of Patent: Jan. 26, 2021

(54) PYROLYSIS PRODUCT COMPRESSION

(71) Applicant: ExxonMobil Chemical Patents Inc., Baytown, TX (US)

(72) Inventors: Thomas W. Pavia, Singapore (SG); Federico Barrai, Houston, TX (US); Frank Hershkowitz, Basking Ridge, NJ (US); Gregory E. Yeo, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/321,056

(22) PCT Filed: Aug. 15, 2017

(86) PCT No.: PCT/US2017/046964
§ 371 (c)(1),
(2) Date: Jan. 28, 2019

(87) PCT Pub. No.: WO2018/044558
PCT Pub. Date: Mar. 8, 2018

(65) Prior Publication Data
US 2019/0169510 A1    Jun. 6, 2019

Related U.S. Application Data

(60) Provisional application No. 62/466,050, filed on Mar. 2, 2017, provisional application No. 62/381,722, filed on Aug. 31, 2016.

(51) Int. Cl.
| | | |
|---|---|---|
| *C10G 9/26* | (2006.01) | |
| *C10G 9/00* | (2006.01) | |
| *F02C 3/20* | (2006.01) | |
| *F02C 6/00* | (2006.01) | |
| *B01J 19/18* | (2006.01) | |
| *F02C 3/10* | (2006.01) | |
| *F02C 6/18* | (2006.01) | |

(52) U.S. Cl.
CPC ............ *C10G 9/26* (2013.01); *B01J 19/1837* (2013.01); *C10G 9/002* (2013.01); *F02C 3/10* (2013.01); *F02C 3/20* (2013.01); *F02C 6/00* (2013.01); *F02C 6/003* (2013.01); *F02C 6/18* (2013.01); *C10G 2300/4006* (2013.01); *C10G 2300/4012* (2013.01)

(58) Field of Classification Search
CPC ...... F02C 6/18; F02C 6/00; F02C 3/20; F02C 6/003; F02C 3/10; C10G 9/002; B01J 19/1837; B01J 6/008
USPC .................................. 585/648, 652
See application file for complete search history.

(56) References Cited

U.S. PATENT DOCUMENTS

| | | |
|---|---|---|
| 3,233,005 A | 2/1966 | Shannahan et al. |
| 2007/0261991 A1 | 11/2007 | Beattie et al. |
| 2008/0210598 A1 | 9/2008 | Annamalai et al. |

(Continued)

FOREIGN PATENT DOCUMENTS

| | | |
|---|---|---|
| WO | 2010/077461 A | 7/2010 |
| WO | 2013/043287 A | 3/2013 |

*Primary Examiner* — Thuan D Dang

(57) ABSTRACT

The invention relates to the compression of a pyrolysis product to facilitate light olefin separation. The pyrolysis product is produced in a pyrolysis reaction. A power generator produces a first shaft power and a second shaft power. The pyrolysis product is compressed using at least part of the first shaft power and at least part of the second shaft power.

10 Claims, 5 Drawing Sheets

(56) References Cited

U.S. PATENT DOCUMENTS

2013/0211169 A1  8/2013  Hershkowitz et al.
2014/0378728 A1  12/2014  Davis et al.
2016/0176781 A1  6/2016  Hershkowitz et al.

PYROLYSIS PRODUCT COMPRESSION

CROSS-REFERENCE TO RELATED APPLICATIONS

This application is a National Stage Application of International Application No. PCT/US2017/046964 filed Aug. 15, 2017, which claims the benefit of U.S. Patent Application No. 62/466,050, filed Mar. 2, 2017, and U.S. patent application Ser. No. 381,722, filed Aug. 31, 2016, which are incorporated herein by reference. Cross reference is made to the following related patent applications: U.S. Patent Application Ser. No. 62/402,009, filed Sep. 30, 2016, U.S. Patent Application Ser. No. 62/486,545, filed Apr. 18, 2017, PCT Patent Application No. PCT/US2017/046871, filed Aug. 15, 2017, and PCT Patent Application No. PCT/US2017/046879, filed Aug. 15, 2017, which are incorporated by reference herein.

FIELD OF THE INVENTION

The invention relates to pyrolysis product compression using first and second shaft powers produced in a power generator. The invention also relates to processes, systems, and apparatus for carrying out the pyrolysis, the power generation, and the compression.

BACKGROUND OF THE INVENTION

Olefinic compounds are a class of hydrocarbon compounds which have at least one double bond of four shared electrons between two carbon atoms. In part as a result of their utility as feeds for producing desirable products, olefin demand to grow, particularly for light olefin such as ethylene, propylene, and butenes.

Light olefin is typically manufactured in an olefins plant (e.g., an ethylene plant) which includes production and recovery facilities. In certain conventional olefins plants, the olefin production facility includes one or more steam cracker furnaces for steam cracking hydrocarbon-containing feeds. A steam cracker furnace generally includes a convection section and a radiant section. The radiant section includes a plurality of tubular members which are typically referred to as "radiant tubes". The radiant tubes are located proximate to one or more fired heaters, e.g., burners, in the radiant section which heat the outer surface of the furnace tubes. Hot combustion gases exit the radiant section and are introduced into the convection section. The convection section also includes tubular members, typically referred to as "convection tubes". The hot gases from the radiant section heat the outer surfaces of the convection tubes and then exit the convection section.

Conventional steam cracking processes typically produce light olefin by hydrocarbon pyrolysis during pyrolysis mode. Coke and other deposits which form during pyrolysis mode are removed from the furnace internals during regeneration (decoking) mode. During pyrolysis mode, a hydrocarbon-containing feed is introduced into the convection tubes for feed preheating. Feed preheating is carried out in segments of the convection tubes located in an upper region of the convection section. Steam is combined with the preheated feed, and the steam-feed mixture is further heated in segments of the convection tubes located in a lower region of the convection section. The heated feed-steam mixture is introduced into the heated furnace tubes in the radiant section, and heat transferred from the furnace tube to the mixture results in the pyrolysis of at least a portion of the feed to produce a process gas comprising light olefin. During regeneration mode, a flow of oxygenate-containing decoking fluid (e.g., a gaseous steam-air mixture) is substituted for the hydrocarbon-containing feed, and the burners continue to heat the radiant and convection sections. The decoking fluid is conducted through the heated convection tubes, heated radiant tubes, and associated furnace piping, internals, etc., to at least partly remove deposited coke. After sufficient coke removal is achieved, the steam cracking furnace is returned to pyrolysis mode operation.

In certain steam cracking processes, e.g., those disclosed in U.S. Patent Application Publication No. 2007-0261991, the process gas is cooled by an indirect transfer of heat from the process gas to water in one or more transfer line heat exchangers ("TLE"). Saturated steam from the TLE is conducted to a steam drum. Condensed water in the steam drum is recycled to the TLE, typically via thereto-syphoning. Saturated steam can be conducted away from the steam drum to processing equipment located in the olefins plant and elsewhere, with condensed water make-up obtained from a suitable source. For example, saturated steam can be conducted away from the steam drum for superheating in one or more superheater tubes positioned between segments of the convection coils.

To lessen the difficulties associated with separating products such as ethylene from the process gas, the cooled process gas is typically compressed in a process gas compressor located in the olefin plant's recovery facility. U.S. Patent Application Publication No. 2008-0210598 discloses using shaft power derived from a steam turbine to power the process gas compressor. Superheated steam exiting the convection section's superheater coils is utilized as a steam source for the steam turbine.

Although this method is effective for powering the process gas compressor, the steam cracker furnace's thermal efficiency is decreased because additional furnace firing is needed to superheat the saturated steam, e.g., furnace firing beyond that needed to produce the process gas. Another difficulty encountered when carrying out the method results from variations in the temperature and pressure of the superheated steam that typically occur during steam cracking. As a result of effects such as radiant tube coking, the amount of furnace firing needed to produce the process gas is greater at the end of the steam cracking process than at its start. As disclosed in P.C.T. Patent Application No. WO 2010-077461, water can be introduced into the superheater coil to at least partially overcome this difficulty by de-superheating the steam. The amount of water supplied to the de-superheater is controlled to prevent damage to the steam turbine. This benefit is obtained, however, at a further loss in the furnace's thermal efficiency resulting from the additional furnace firing needed to vaporize the de-superheater water.

Since process gases from a plurality of steam cracking furnaces are typically combined upstream of the process gas compressor, another difficulty arises when one or more furnaces is unexpectedly taken off-line, e.g., by decreasing or halting the amount of furnace firing. Since decreasing steam turbine shaft power can damage the process gas compressor, commercial steam cracking facilities typically include additional steam generators which continuously produce additional superheated steam. The additional superheated steam is substituted for a steam cracker furnace's superheated steam when the furnace is unexpectedly taken off line. Although the risk of compressor damage is lessened, the additional steam generators further decrease the olefin plant's thermal efficiency.

Another operational difficulty results from the coupling (via the superheated steam) of the olefin production facility's steam cracking furnaces and olefin recovery facility. Since these facilities are coupled, modification of the steam cracking furnaces, e.g., in order to increase the amount of process gas produced by the furnaces, is made more difficult by a corresponding need to modify the steam-driven power cycle in the recovery facility.

In order to at least partly overcome these difficulties, proposals have been made to obtain power for the process gas compressor from a power source external to the olefin production facility, such as from a gas turbine powering an electric generator, which in turn powers an electric motor providing shaft power to the process gas compressor. However, directly driving a process gas compressor with shaft power produced by a "stand-alone" gas turbine is reported to be infeasible, e.g., as a result the gas turbine's shorter maintenance schedule compared to that of a typical steam cracker furnace. The low thermal efficiency of a typical gas turbine also leads to a decrease in the olefin plant's overall thermal efficiency.

There is therefore a need for more thermally-efficient olefin production plants, particularly those which decouple the plant's production and recovery facilities.

SUMMARY OF THE INVENTION

The invention is based in part on the discovery that a power plant producing first and second shaft powers from first and second working fluids can be used to produce sufficient power for driving the process gas compressor without significantly degrading the olefin plant's thermal efficiency. The invention beneficially decreases or entirely obviates the need for additional steam production, which otherwise would be needed as a hedge against unexpected steam cracker furnace outages. The invention also beneficially decouples the olefin plant's production and recovery facilities, which lessens the cost and complexity that would otherwise be associated with producing additional process gas.

Accordingly, certain aspects of the invention relate to a hydrocarbon pyrolysis process for producing a compressed process gas comprising light olefin such as ethylene. The process utilizes a hydrocarbon feed, a fuel, first and second working fluids, a tubular flow-through reactor, a power generator, and a process gas compressor. The first working fluid comprises oxidant, and at least a portion of the second working fluid is in the liquid phase. The power generator includes a compressor stage, a combustion stage, first and second expansion stages, and a heat transfer stage.

In accordance with these and other aspects of the process, a flow of the feed is established to the reactor operating under pyrolysis conditions to produce a process gas comprising light olefin such as ethylene. A flow of the first working fluid is established to the compressor stage for compression. A flow of the fuel is established to the combustion stage. At least a portion of the fuel is combusted with at least a portion of the compressed working fluid's oxidant to produce a heated effluent. The heated effluent is expanded in the first expansion stage to produce a decompressed effluent and the first shaft power. Heat is transferred from the decompressed effluent to the second working fluid in the heat transfer stage to vaporize at least a portion of the second working fluid. The vaporized second working fluid is expanded in the second expansion stage to produce the second shaft power. At least part of the first shaft power and at least part of the second shaft power are transferred to the process gas compressor to compress at least a portion of the process gas.

In still other aspects, the invention relates to reactors, power generators, and compressors for carrying out these and other aspects of the invention, and to systems and processes which integrate olefin production facility components, power generators, and recovery facility components to produce light olefin.

DETAILED DESCRIPTION

Figure 1:
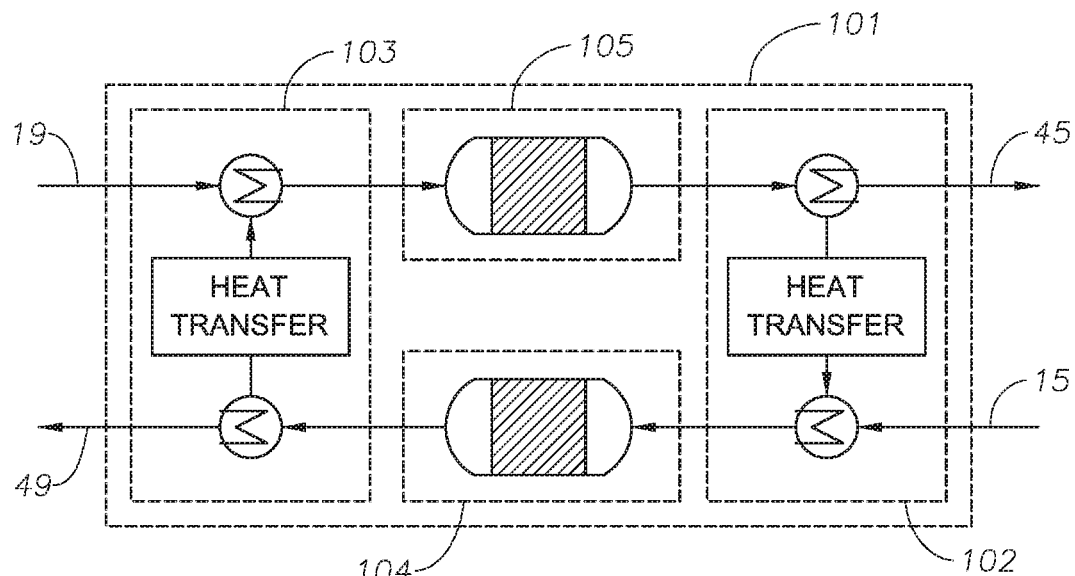
FIG. 1 conceptually shows transfers of heat that can occur in a regenerative reverse-flow pyrolysis reactor during regeneration mode (top) and pyrolysis mode (bottom).

Certain aspects of the invention relate to processes, systems, and apparatus for producing a compressed process gas comprising light olefin such as ethylene. The process utilizes a pyrolysis reactor, e.g., a tubular flow-through reactor, to produce the process gas. A power generator utilizes at least first and second utility fluids to produce at least first and second shaft powers. A compression stage compresses the process gas in at least one process gas compressor powered by at least a portion of the first and second shaft powers.

Certain features of regenerative reverse-flow thermal pyrolysis reactors make this form of reactor particularly suitable for producing the process gas. Unlike steam cracking furnaces, heat is recovered within the reverse-flow thermal pyrolysis reactor, and the recovered heat is stored by reactor components during both regeneration mode and pyrolysis mode operation. Heat recovered and stored in the reactor during pyrolysis mode is available for subsequent heat transfer to process streams during regeneration mode, e.g., for heat transfer to fuel and/or air. This transfer lessens the amount of heat that would otherwise need to be supplied to the reactor during regeneration mode, as would be the case in a steam cracker furnace operating in regeneration mode. Heat recovered and stored in the reactor during regeneration mode is available for a transfer of heat during a subsequent pyrolysis mode, which decreases or entirely obviates the need for furnace heating during pyrolysis mode operation. Transferring heat away from the reactor to fuel and/or air during combustion mode cools that region of the reactor which is used for quenching the pyrolysis product during pyrolysis mode. This reactor cooling beneficially lessens or entirely obviates the need for external quenching (e.g., in one or more TLEs) of the pyrolysis product. Since TLEs are typically not needed when utilizing regenerative reverse-flow thermal pyrolysis reactors, the power generator and pyrolysis reactor can be substantially energetically-independent. An energetically-independent power generator is desirable because it at least partially overcomes the difficulties associated with increased or decreased compressor power requirements in response, e.g., to unexpected reactor outages, increases or decreases in process gas yields, etc. Certain desirable features of regenerative reverse-flow thermal pyrolysis reactors will now be explained in more detail with reference to FIG. 1.

Conceptually, regenerative reverse-flow thermal pyrolysis reactor 101 encompasses first 102 and second 103 heat transfer zones, a pyrolysis zone 104, and a combustion zone 105. These zones are shown schematically in FIG. 1 when the reactor operates in combustion mode (upper part of figure) and pyrolysis mode (lower part of figure). The figure is conceptual in that, e.g., the pyrolysis zone and combustion zone can occupy substantially the same (or overlapping) physical space within the reactor, albeit at different times. Methods used to establish initial conditions in these zones at the start of operation are not critical. For example, if the reactor is to begin in pyrolysis mode, conventional methods can be used to preheat the reactor's first heat transfer zone and precool the second heat transfer zone, but the invention is not limited thereto. During pyrolysis mode, which operates in forward flow (substantially from right to left as shown in the figure), heat is transferred from the reactor to the feed in the first heat transfer zone. Sufficient heat is transferred in the first heat transfer zone to pyrolyse the heated feed in the pyrolysis zone. The pyrolysis product is cooled by a transfer of heat from the pyrolysis effluent to the reactor in the second heat transfer zone, which rapidly quenches the pyrolysis product. Condensable constituents that may be present in the pyrolysis product typically deposit in the second heat transfer zone. The process gas, which typically comprises the remainder of the pyrolysis product, is conducted away via line 49 as shown. A useful feature of regenerative reverse-flow thermal pyrolysis reactors is that at least part of the heat removed from the pyrolysis product during the quenching (less any radiative, conductive, and convective losses) is stored in the reactor's second heat transfer zone and is available for transfer during regeneration mode operation. Another useful feature is that at least part of the heat removed from the combustion effluent during the quenching (again, less any radiative, conductive, and convective losses) is stored in the reactor's first heat transfer zone and is available for transfer during pyrolysis mode operation. These features are illustrated schematically in FIG. 1.

During regeneration mode, which is carried out in reverse-flow (e.g., substantially from left to right, as shown), oxidant and fuel are introduced into the reactor via line 19, which typically comprises substantially separate fuel channels and oxidant channels. The fuel and oxidant are conveyed through the second heat transfer zone toward the combustion zone. Sufficient heat is transferred from the reactor in the second heat transfer zone to the fuel and air for these to combust in the combustion zone. Heat is transferred from the combustion effluent to reactor the first heat transfer zone. Thus, the first and second heat transfer zones are regenerated for a following forward-flow thermal pyrolysis interval.

It is not necessary that both the fuel and oxidant be heated in the second heat transfer zone to carry out the combustion. The other (non-heated) component can be introduced into the combustion zone by way of one or more bypass lines (not shown). Typically, at least the oxidant is heated in the second heat transfer zone during combustion mode in order to oxidize and remove at least a portion of any combustible deposits remaining from previous pyrolysis mode intervals, and also to mechanically ablate and remove at least a portion of any remaining non-combustible deposits. More typically, both fuel and oxidant are conveyed through the second heat transfer zone during combustion mode, generally via different channels to prevent pre-ignition upstream of the combustion zone.

Process gas conducted away from the pyrolysis reactor is compressed in a process gas compressor so that light olefins and other components of the process gas can be separated and recovered in the olefin recovery facility. The process gas compressor is powered by shaft power. At least part of the shaft power is obtained from first and second shaft powers produced in a power generator that can be substantially independent energetically of the pyrolysis reactor. These components will now be described in more detail with reference to the following definitions, which shall apply to this description and appended claims.

Definitions

The following terms are defined for this description and appended claims.

The term "$C_n$" hydrocarbon means hydrocarbon having n carbon atom(s) per molecule, wherein n is a positive integer. The term "$C_{n+}$" hydrocarbon means hydrocarbon having at least n carbon atom(s) per molecule. The term "$C_{n-}$" hydrocarbon means hydrocarbon having no more than n carbon atom(s) per molecule. The term "hydrocarbon" means a class of compounds containing hydrogen bound to carbon, and encompasses (i) saturated hydrocarbon, (ii) unsaturated hydrocarbon, and (iii) mixtures of hydrocarbons, and including mixtures of hydrocarbon compounds (saturated and/or unsaturated), such as mixtures of hydrocarbon compounds having different values of n.

The terms "alkane" and "paraffinic hydrocarbon" mean substantially-saturated compounds containing hydrogen and carbon only, e.g., those containing ≤1% (molar basis) of unsaturated carbon atoms. The term "unsaturate" and "unsaturated hydrocarbon" refer to one or more $C_{2+}$ hydrocarbon compounds which contain at least one carbon atom directly bound to another carbon atom by a double or triple bond. The term "olefin" refers to one or more unsaturated hydrocarbon compound containing at least one carbon atom directly bound to another carbon atom by a double bond. In other words, an olefin is a compound which contains at least one pair of carbon atoms, where the first and second carbon atoms of the pair are directly linked by a double bond. The term "aromatics" and "aromatic hydrocarbon" mean hydrocarbon compounds containing at least one aromatic ring.

The terms "regenerator", "recuperator", "regenerative bed", "monolith", "honeycomb", "reactant", "fuel", and "oxidant" have the meanings disclosed in U.S. Pat. No. 7,943,808, which is incorporated by reference herein in its entirety. A "pyrolysis reactor" is a reactor, or combination of reactors or a reactor system for hydrocarbon pyrolysis. The term "pyrolysis stage" means at least one pyrolysis reactor, and optionally including means for conducting one or more feeds thereto and/or one or more products away therefrom. A "region" or "zone" is a location, e.g., a specific volume, within a reactor, a location between two reactors and/or the combination of different locations in one or more reactors. A "pyrolysis region" is a location where pyrolysis is carried out, e.g., in a location which contains or is proximate to components, such as at least one thermal mass, which provides heat for the pyrolysis. A reactor or reaction stage can encompass one or more reaction regions. More than one reaction can be carried out in a reactor, stage, or region.

A pyrolysis region can include components having conduits, channels, and passages. The term "conduit" refers to means for conducting a composition from one location to another. The term encompasses (i) elementary conducting means, such as a pipe or tube, and (ii) complex means such as tortuous pathways through conducting means, e.g., pipes, tubes, valves, and reactors, that are filled with random packing. The term "passage" means a geometrically contiguous volume element that can be utilized for conveying a fluid within a reactor, regenerator, recuperator, regenerative bed, monolith, honeycomb, etc. The term "channel" means a plurality of passages that can be utilized together for conveying a fluid within the reactor, regenerator, recuperator, regenerative bed, monolith, honeycomb, etc. For example, a honeycomb monolith can comprise a single channel, with the channel having a plurality of passages or sets of passages.

The term "bulk gas temperature" means the temperature of a bulk gas steam as measured by a device (such as a thermocouple) that is in contact with the bulk gas but not in contact with a solid thermal mass. For example, if the gas is traveling through an internal channel of length $L_c$ of a thermal mass in the pyrolysis zone of a thermal pyrolysis reactor, the bulk gas temperature at a location along $L_c$ is the average temperature (arithmetic mean) over the channel's cross sectional area at that location. The peak gas temperature is the greatest cross-sectional-averaged bulk gas temperature achieved along a flowpath. One skilled in the art will appreciate that a gas temperature immediately proximate to a solid thermal mass, such as a partition between passages within a thermal mass at any particular location may exceed the bulk gas temperature, and may, in some infinitesimal layer, actually approach the solid's temperature. The average bulk gas temperature "$T_{av}$" over a region of the reactor, e.g., of the pyrolysis zone, is obtained using the formula:

$$T_{av} = \left[\frac{1}{b-a} \times \int_a^b T(x)dx\right].$$

Parameters a and b are the boundaries of an interval (distance) along the long axis of the reactor. For example, referring to FIG. 2, parameter "a" can be the position of aperture 5 and parameter "b" can be the position of aperture 9. T(x) is a function representing the variation of bulk gas temperature over the interval of from a to b. When T(x) is a bulk gas temperature profile of a pyrolysis zone, e.g., the pyrolysis zones indicated (at the start of $t_P$) by the shaded regions in FIG. 3, parameters a and b are the locations where the bulk gas temperature profile intersects the line $T_{MIN}$, which corresponds to the minimum temperature at which feed conversion is ≥10% under the selected pyrolysis conditions and feed. Since the bulk gas temperature profile typically changes during the pyrolysis time interval $t_P$, as shown in FIG. 3, $T_{av}$ will typically decrease during $t_P$. The portion of the profile having a temperature ≥$T_{MIN}$ can be continuous, but this is not required. For example, when a profile that intersects $T_{MIN}$ at more than two locations in the pyrolysis zone (e.g., a, b) and touches $T_{MIN}$ at a location c (not shown, but between a and b), additional integrations are carried out, e.g.:

$$T_{av} = \frac{1}{b-a}\int_a^b T(x)dx + \frac{1}{c-b}\int_b^c T(x)dx.$$

When the portion of the profile that is ≥$T_{MIN}$ is in the form of discrete segments, the integrations are performed over each of the segments.

The term "pyrolysis" means an on-average endothermic reaction for converting molecules into (i) atoms and/or (ii) molecules of lesser molecular weight, and optionally (iii) molecules of greater molecular weight, e.g., processes for converting ethane and/or propane to molecular hydrogen and unsaturates such as ethylene, propylene and acetylene.

A hydrocarbon feed is subjected to "thermal pyrolysis" when <50.0% of the heat utilized by the pyrolysis is provided by exothermically reacting the hydrocarbon teed, e.g., with an oxidant, e.g., ≤25%, such as ≤10%, or ≤1%. The "severity threshold temperature" for pyrolysis is the lowest bulk gas temperature at which acetylene selectivity is at least 10% for a residence time ≤0.1 second. High-severity pyrolysis conditions are those carried out at a peak gas temperature that is greater than or equal to the severity threshold temperature. Low-severity pyrolysis conditions are those carried out at a peak gas temperature that is less than the severity threshold temperature, i.e., conditions under which substantially no hydrocarbon pyrolysis is carried out at a pyrolysis gas temperature that exceeds the severity threshold temperature. High-severity conditions include those which exhibit (i) a methane selectivity ≥5 wt. % and/or (ii) a propylene selectivity at a temperature ≥1000° C. of ≤0.6 wt. %. With respect to pyrolysis reactors, the term "residence time" means the average time duration for non-reacting (non-converting by pyrolysis) molecules (such as He, $N_2$, Ar) having a molecular weight in the range of 4 to 40 to traverse a pyrolysis region of a pyrolysis reactor.

The term "Periodic Table" means the Periodic Chart of the Elements appearing on the inside cover of The Merck Index, Twelfth Edition, Merck & Co., Inc., 1996. "Steam Tables" can be found in M. D. Koretsky, "Engineering and Chemical Thermodynamics", John Wiley & Sons, 2004. When a temperature is indicated, the units "K" indicate degrees Kelvin, the SI unit of temperature.

In certain aspects, the process gas is produced in one or more reactors located in the olefin plant's production facility. Regenerative reverse-flow thermal pyrolysis reactors which can be used in these facilities will now be described in more detail with reference to FIGS. 2 and 3. The invention is not limited to these aspects, and this description is not meant to foreclose the use of other reactors within the broader scope of the invention.

Representative Regenerative Thermal Pyrolysis Reactors

Regenerative pyrolysis reactors typically comprise an internal volume having at least one region. A regenerable thermal mass having at least one internal channel is positioned in this region. A reactor temperature profile is established sufficient for carrying out the pyrolysis, e.g., by heating the thermal mass, and a flow of the hydrocarbon-containing feed is established through the channel. Heat is transferred from the thermal mass to the hydrocarbon feed, which increases the hydrocarbon feed's temperature and results in thermal pyrolysis of at least a portion of the feed, e.g., pyrolysis carried out in the substantial absence of oxidant. The pyrolysis produces a pyrolysis product typically comprising molecular hydrogen, methane, acetylene, ethylene, and $C_{3+}$ hydrocarbon, where the $C_{3+}$ hydrocarbon includes coke and coke precursors. At least a portion of the coke typically remains in the passages of the thermal mass, and the remainder of the pyrolysis product is typically conducted away from the reactor as the process gas. Since the pyrolysis is endothermic, pyrolysis mode operation will eventually cool the thermal mass, e.g., to a temperature at which the pyrolysis cannot be carried out efficiently. The ability to efficiently carry out pyrolysis reactions is restored by regenerating the reactor during regeneration mode.

Figure 2:
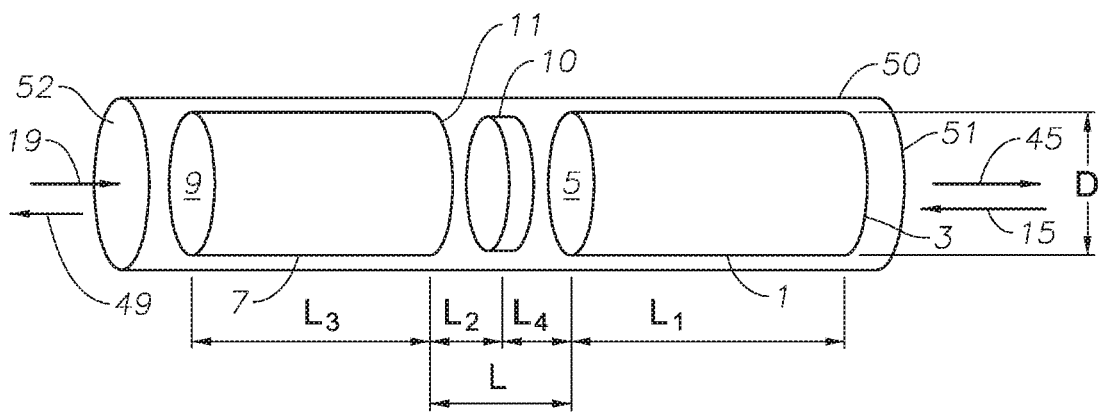
FIG. 2 schematically shows forms of a representative reverse flow thermal pyrolysis reactor.
Figure 3:
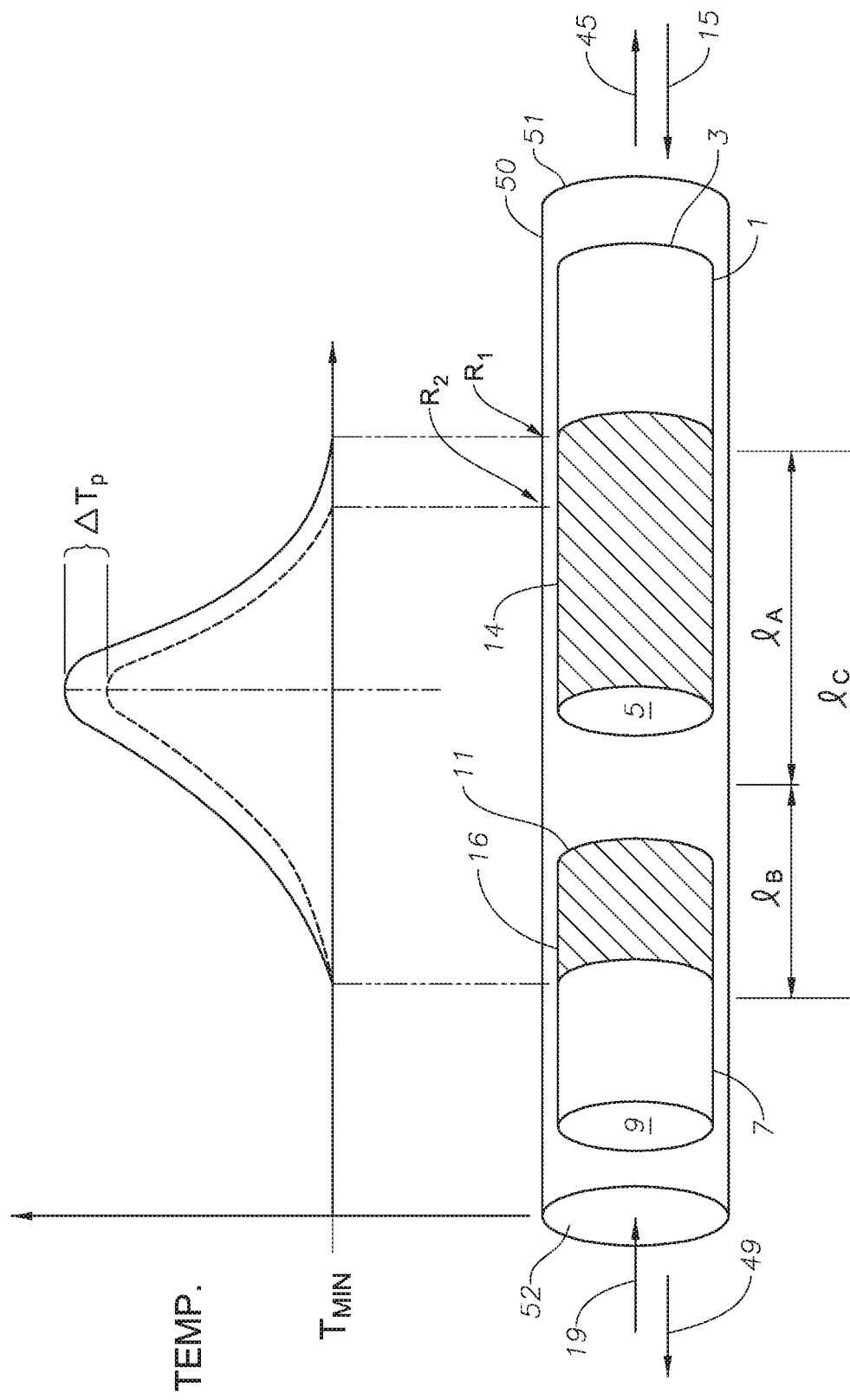
FIG. 3 schematically show representative bulk gas temperature profiles at the start (solid lines) and end (dashed lines) of pyrolysis mode for the reactor of FIG. 2.

Thermal characteristics of reactor 50 of FIGS. 2 and 3 are substantially congruent with those described in connection with conceptual reactor 101 of FIG. 1. Reactor 50 is in the form of an elongated tubular vessel having an internal volume which includes at least one heat transfer zone and at least one pyrolysis zone. The reactor vessel's cross sectional shape and/or cross sectional area can be substantially uniform over the length of the reactor, but this is not required. For example, one or more segments of the reactor vessel's length can have a circular, elliptical, or polygonal cross section. Reactor 50 has opposed first and second openings 51 and 52 which are in fluidic communication with the internal volume and are located at terminal ends of the reactor vessel. The first and second openings are separated by reactor length $L_R$. The reactor also includes at least one thermal mass 1 located in a first region of the internal volume. The thermal mass has at least one internal channel that typically has a length substantially equal to $L_1$. The thermal mass also has a first aperture 3 and a second aperture 5 in fluidic communication with the channel. The first and second apertures are separated by a flow-path through the channel. Typically the flow path has a length substantially equal to $L_1$. The first aperture is typically located adjacent to the first opening.

During pyrolysis mode, a forward flow of hydrocarbon-containing feed is established into the channel toward the second aperture by introducing the feed through the first opening 51 via line 15 and through the first aperture 3. Pyrolysis mode is operated during a time interval $t_P$ which starts at a first time $t_1$ and ends at a second time $t_2$. The feed is heated by a transfer of heat from at least a segment of the first thermal mass 1 (conceptually the first heat transfer zone). Typically, a first segment of the first thermal mass 1 is located in the first heat transfer zone (the un-shaded segment of first thermal mass 1 as shown in FIG. 3), with a second segment being located in the pyrolysis zone (the shaded segment). This heat transfer sufficiently heats the feed so that it undergoes thermal pyrolysis in the reactor's internal volume, e.g., proximate to thermal mass 1, which produces a flow of a pyrolysis product comprising molecular hydrogen and $C_{2+}$ olefin. The pyrolysis conditions include a gas temperature profile within the reactor at $t_1$ which exhibits a peak gas temperature $T_P$ and an average gas temperature $T_{av}$ that is $<T_P$. $T_P$ is typically in the range of from 800° C. to 1400° C. Typically, the bulk gas temperature profile at the start of pyrolysis mode (solid curve) continuously varies over the length of the pyrolysis zone. The pyrolysis is on average endothermic, so carrying out the pyrolysis cools the reactor during $t_P$, resulting in a decrease in $T_P$ and a second bulk gas temperature profile (dashed curve) at $t_2$. The flow of the pyrolysis product is conducted into the second region of the internal volume via the second aperture 5, and the process gas is conducted away from the reactor via the second opening 52 and line 49. Optionally, a second thermal mass 7 is positioned in the reactor's internal volume as shown in FIGS. 2 and 3. The pyrolysis product is cooled in the reactor's internal volume by a transfer of heat from the pyrolysis product to at least a segment of second thermal mass 7 (conceptually, the second heat transfer zone). Typically, a first segment of the second thermal mass 7 is located in the second heat transfer zone (the un-shaded segment of second thermal mass 7 as shown in FIG. 3), and a second segment is located in the pyrolysis zone (the shaded segment). Following pyrolysis mode (e.g., after $t_2$), the reactor is regenerated by operating in regeneration mode for a regeneration time interval $t_R$ that is of sufficient duration to at least partially restore the reactor to conditions under which additional pyrolysis can be carried out.

In certain aspects (not shown), regeneration includes combusting at least a portion of a fuel-oxidant heating mixture during $t_R$ in a location other than within the internal volume of reactor 50. For example, fuel combustion can be carried out at a location external to reactor 50, with the combustion products, unreacted oxidant, and optionally unreacted fuel being conveyed to the vicinity of the pyrolysis zone for (i) heating the pyrolysis zone to provide a desired temperature profile for efficiently carrying out the pyrolysis and (ii) removing at least a portion of any deposits remaining in the reactor at the start of regeneration mode. In aspects Where optional second thermal mass 7 is present in reactor 50, as shown in FIGS. 2 and 3, regeneration mode includes conveying a reverse-flow of heating mixture 19 comprising fuel and oxidant through opening 52, through aperture 9 of thermal mass 7, and out of aperture 11 toward a region of the reactor's internal volume located between the first and second thermal masses (which region conceptually corresponds to the combustion zone). Typically, the fuel and oxidant are conveyed separately through different channels of second thermal mass 7 from aperture 9 toward aperture 11, and are mixed and distributed by mixer-distributor 10 to form the heating mixture downstream (with respect to fuel/oxidant flow) of thermal mass 7. Typically fuel and oxidant are heated by a transfer of heat from at least a segment of thermal mass 7 (conceptually, the second heat transfer zone) as the fuel and oxidant flow through channels of thermal mass 7. Combustion of the fuel and oxidant produces a combustion effluent in the region of the reactor's internal volume between thermal masses 7 and 1 (conceptually, the combustion zone). Combustion effluent, any un-combusted oxidant, and any un-combusted fuel enter aperture 5. An aggregated combustion effluent 45 is conducted out of aperture 3 and away from the reactor via opening 51. The aggregate combustion effluent typically comprises combustion effluent produced in a region of the internal volume located between apertures 11 and 5; additional combustion effluent, typically from deposits-removal in passages of thermal mass 1; and any unreacted fuel and/or any unreacted oxidant. Heat is transferred from the combustion effluent to at least a segment of the first thermal mass (conceptually corresponding to the first heat transfer zone).

Combustion can be carried out in a region within the internal volume of reactor 50, e.g., an open volume having a length L and substantially constant circular cross section of diameter D and cross sectional area A (not shown). As may be appreciated, an open volume having an appropriate L:A ratio will provide at least some mixing and distribution during regeneration mode without creating too great a pressure drop during pyrolysis mode. More typically, since it provides improved mixing and distribution and allows a lesser overall length for the combustion zone, the combustion zone includes at least one mixer-distributor apparatus 10. When used, mixer-distributor 10 can be centered in the region between apertures 11 and 5, e.g., with $L_2$ being substantially equal to $L_4$. The sum of lengths $L_1$, L, and $L_3$ is typically ≥90% of the total length of reactor 50 ($L_R$), e.g., as measured between openings 51 and 52. Since it is desirable to direct fuel and oxidant flows into appropriate passages of thermal mass 7 during regeneration mode and to direct pyrolysis feed flow into appropriate passages of thermal mass 1 during pyrolysis mode, it can be desirable to limit the internal volume between aperture 9 and opening 52 and between aperture 3 and opening 51 to that needed for convenient reactor assembly and to prevent component interference as might otherwise occur from thermal expansion during use. For, example, the distance along the flow path between aperture 9 and opening 52 is typically ≤0.1 $L_R$, such as ≤0.01 $L_R$, or ≤0.01 $L_R$. Likewise, the distance along the flow path between aperture 3 and opening 51 is typically ≤0.1 $L_R$, such as ≤0.01 $L_R$, or ≤0.01 $L_R$. The pyrolysis zone, which generally encompasses all of region L, a segment of $L_1$, and a segment of $L_3$, is typically ≥10% of the total length of reactor 50, e.g., ≥15%, or ≥20%. It is also typical for the pyrolysis zone to encompass ≤80% of the total length of reactor 50, e.g., to leave sufficient internal volume of thermal mass 1 for pre-heating the pyrolysis feed and sufficient internal volume of thermal mass 7 for pyrolysis product quenching, such as, ≤60%, or ≤40%. In certain aspects, the pyrolysis zone has a length in the range of from 10% to 60% of the total length of the reactor, e.g., in the range of from 20% to 40%. The combustion zone's length L is typically ≤50% of that of the length of the pyrolysis zone, e.g., ≤40%, such as ≤30%, or ≤20%.

Values for L, $L_1$, $L_2$, $L_3$, $L_4$, and D generally depend on the pyrolysis feed used and the rate at which it is conducted into the reactor, the fuel and oxidant compositions, and the rate at which these are conducted into the reactor, etc. Although larger and small reactors are within the scope of the invention, (i) D is typically ≥1 cm, e.g., in the range of from about 1 cm to 10 in, such as 0.1 m to 7.5 m, (ii) $L_R$ is typically ≥1 cm, e.g., in the range of from about 1 cm to 20 m, such as 0.1 m to 7.5 m, (iii) L is typically ≤25% of $L_R$, e.g., ≤10%, (iv) $L_1$ is typically ≥35% of $L_R$ e.g., ≥45%, (v) $L_3$ is typically ≥35% of $L_R$, e.g ≥45%, $L_3$ being optionally of substantially the same size and shape as $L_1$, and (vi) $L_2$ is typically within about +/−25% of $L_4$, e.g., +/−10%, such as +/−5%.

The mixer-distributor is typically configured to (i) mix the fuel and a portion of the oxidant during regeneration mode for efficient combustion, (ii) increase distribution uniformity over the first heat transfer zone's internal cross sectional area of the combustion products, unreacted oxidant, and optionally unreacted fuel, and (iii) lessen undesirable pressure-drop effects during pyrolysis mode. The mixer-distributor, which can have the form of a relatively thin member (e.g., a plate) having one or more orifices effective for carrying out the mixing and distribution during regeneration mode. Generally, the orifices have sufficient cross sectional area to prevent an undesirably large pressure drop across the reactor during pyrolysis mode. Conventional mixer-distributors can be used, such as those described in U.S. Patent Application Publication No. 2013-0157205 A1 and U.S. Pat. No. 7,815,873 (incorporated by reference herein in their entireties), but the invention is not limited thereto. Optionally, combustion is carried out in the presence of at least one selective combustion catalyst, e.g., one or more of those described in U.S. Pat. No. 8,754,276, but the invention is not limited thereto. When used, a fixed bed of the selective combustion catalyst can be included as a component of the mixer-distributor, e.g., with one or more of the mixer-distributor's plate members serving as a catalyst support. In certain aspects, however, such as those where the amount of coke deposits in thermal mass 1 exceed that of thermal mass 7, the combustion zone is shifted downstream (with respect to fuel-oxidant flow) toward thermal mass 1. The amount of shift is typically ≤25% of L, e.g., ≤20%, such as ≤10%.

The combustion zone occupies a region of reactor 50's internal volume during $t_R$ that is within the pyrolysis zone during $t_P$. However, since in the aspects illustrated in FIGS. 2 and 3 regeneration mode is not carried out at the same time as pyrolysis mode, appreciable combustion does not occur in the combustion zone during pyrolysis mode and appreciable pyrolysis does not occur in the pyrolysis zone during regeneration mode. Reactor 50 can be switched from regeneration mode to pyrolysis mode after sufficiently removing any accumulated deposits and achieving the desired reactor temperature profile for pyrolysis.

Typically, the first and second thermal masses comprise bedding or packing material that is effective in storing and transferring heat, such as glass or ceramic beads or spheres, metal beads or spheres, ceramic (e.g., ceramics, which may include alumina, yttria, and zirconia) or honeycomb materials comprising ceramic and/or metal, other forms of tubes comprising ceramic and/or metal, extruded monoliths and the like. The thermal masses and regenerative beds containing thermal masses can be channeled members comprising refractory, e.g., those described in U.S. Pat. Nos. 8,754,276; 9,126,882; 9,346,728; 9,187,382; 7,943,808; 7,846,401; 7,815,873; 9,322,549; and in U.S. Patent Application Publication Nos. 2007-0144940, 2008-300438, 2014-303339, 2014-163287, 2014-163273, 2014-0303416, 2015-166430, 2015-197696, and 2016-176781. These references are incorporated by reference herein in their entireties. Thermal masses 1 and 7 can each have the form of an elongated refractory honeycomb. The honeycomb comprising at least one channel, the channel having a plurality of passages. When the channels and passages are substantially uniform in cross-sectional size and shape, the honeycomb (and segments thereof) has a substantially-constant OFA.

The thermal masses typically have a thermal conductivity in the range of from 0.5 W/m° K to 50 W/m° K, a coefficient of thermal expansion in the range of from $1 \times 10^{-7}$/° K to $2 \times 10^{-5}$/° K, an average wetted surface area per unit volume in the range of from 1 $cm^{-1}$ to 100 $cm^{-1}$, and an average wetted surface area per unit volume in the range of from 1 $cm^{-1}$ to 100 $cm^{-1}$. The internal channels of each of the thermal masses typically include a plurality of substantially parallel passages, e.g., at a passage density in the range of from 77000/$m^2$ to $1.3 \times 10^6$/$m^2$. The thermal mass typically comprises refractory, e.g., one having a heat capacity at 300° K that is ≥0.04 [kJ/(° K kg)] and a density ≥3000 kg/$m^3$. For example, the refractory's specific heat capacity at 300° K can be in the range of from 0.04 [kJ/(° K kg)] to 1.2 [kJ/(° K kg)], and its density can be in the range of from 3000 kg/$m^3$ to 5000 kg/$m^3$.

The choice of refractory composition is not critical, provided it is capable of surviving under pyrolysis mode and regeneration mode conditions for practical run lengths (e.g., months) without significant deterioration or decomposition. Those skilled in the art will appreciate that the compositions of the first and second thermal masses should be selected from among those that substantially maintain integrity (structural and compositions) and functionality during long term exposure to pyrolysis feeds, products, and reaction conditions, e.g., temperatures ≥750° C. such as ≥1200° C., or for increased operating margin ≥1500° C. Conventional refractories can be used, including those comprising at least one oxide of one or more elements selected from Groups 2-14 of the Periodic Table, but the invention is not limited thereto. In particular aspects, the refractory includes oxide of at least one of Al, Si, Mg, Ca, Fe, Mn, Ni, Co, Cr, Ti, Hf, V, Nb, Ta, Mo, W, Sc, La, Yt, Zr, and Ce. The refractory can include non-oxide ceramic.

Representative conditions and feeds for regeneration mode and pyrolysis mode will now be described in more detail. The invention is not limited to these feeds and process conditions, and this description should not be interpreted as foreclosing other feeds and process conditions within the broader scope of the invention.

Regeneration Mode

Regeneration mode is carried out to (i) reheat the pyrolysis zone to establish a temperature profile corresponding to the desired bulk gas temperature profile at the start of a following pyrolysis mode and (ii) remove sufficient deposits from within the reactor's internal volume, which otherwise might lead to an increase in reactor pressure drop. When it is desired to quench the pyrolysis product within the reactor (e.g., to utilize a conceptual second heat transfer zone), regeneration mode optionally includes cooling thermal mass 7 or a segment thereof. Fuel and oxidant contained in the heating mixture combust in the combustion zone during at least part of regeneration mode. A wide range of fuels can be used for combusting with oxidant and regenerate the pyrolysis reactor, including hydrocarbon feed. Generally, the fuel is selected from the group consisting of natural gas, hydrocarbon in the natural gas, hydrocarbon separated from the natural gas and/or derived from the natural gas, natural gas condensate, hydrocarbon in the natural gas condensate, hydrocarbon separated from the natural gas condensate and/or derived from the natural gas condensate, crude oil, hydrocarbon in the crude oil, hydrocarbon separated from the crude oil and or derived from the crude oil, molecular hydrogen, carbon monoxide, and mixtures thereof. Fuel and fuel constituents that do not contain hydrocarbon, e.g., one or more of molecular hydrogen, CO, and synthesis gas are within the scope of the invention. Typically, the fuel is derived from, comprises, consists essentially of, or consists of one or more of molecular hydrogen, CO, methane, methane containing streams, such as coal bed methane, biogas, associated gas, natural gas and mixtures or components thereof, etc. The oxidant is typically one or more of molecular oxygen, ozone, and air, including molecular oxygen in air, oxygen-enriched air, and oxygen-deficient air. Optionally, the fuel and oxidant are the same as those disclosed in U.S. Pat. No. 7,943,808. Feed flow rate depends on factors such as feed composition, reactor volume, pyrolysis conditions, etc. Accordingly, the invention can be carried out over a very wide range of heating mixture flow rates, e.g., at a flow rate $\geq 0.001$ kg/s, such as $\geq 0.1$ kg/s, or $\geq 10$ kg/s, or $\geq 100$ kg/s, or more.

Once a fuel of the desired caloric content (heating value) has been selected, the amounts of fuel and oxidant conducted to the reactor during regeneration mode can be specified in terms of the amount of oxidant needed for combusting the accumulated coke deposits ("$OC_a$") and the amount of oxidant ("$OC_b$") needed for the substantially stoichiometric combustion of the fuel. Typically, the amount of oxidant supplied during regeneration mode is $Z \cdot (OC_a + OC_b)$, wherein Z is generally $\geq 0.5$, e.g., $\geq 0.8$, such as in the range of 0.5 to 5.0, or 0.5 to 3.0, or 0.8 to 3.0. The amounts $OC_a$ and $OC_b$ are on a molar basis. When $Z > 1.0$, the excess oxidant can be utilized, e.g., for one or more of removing at least a portion of any accumulated deposits, moderating the reaction temperature during regeneration mode (as disclosed in U.S. Pat. No. 7,943,808), and conveying heat within the reactor from one zone to another. Generally, a first portion of the oxidant is combusted with the fuel in the combustion zone, and a second portion is combusted with accumulated coke deposits. Typically, the first portion comprises $\geq 50$ wt. % of the total amount of oxidant supplied during regeneration mode, e.g., $\geq 75$ wt. %, or $\geq 90$ wt. %. It is also typical for oxidant flow rate and fuel flow rate to remain substantially constant for the duration of regeneration mode. These flow rates are selected to achieve the desired amount of combustion heating and the desired amount of coke removal during $t_R$. A $t_R \leq 30$ seconds is typically sufficient for reheating the reactor to achieve the desired bulk gas temperature profile at the start of pyrolysis mode, e.g., $\leq 25$ seconds, such as $\leq 10$ seconds, or $\leq 1$ second, or $\leq 0.1$ second. For example, $t_R$ can be in the range of from 0.01 second to 25 seconds, or 0.05 second to 10 seconds, or 0.05 second to 5 seconds, or 0.05 second to 1 second. The invention is compatible with conventional methods for lessening coke accumulation in thermal masses during regeneration mode, e.g., those described in U.S. Pat. No. 9,187,382, which is incorporated by reference in its entirety.

Other streams can be provided to the reactor during regeneration mode, e.g., one or more diluent streams can be provided, such as by addition of one or more diluents to the heating mixture, such as to the oxidant and/or fuel. Suitable diluents (which can be a diluent mixture) include one or more of, e.g., oxygenate (water, carbon dioxide, etc.), non-combustible species, such as molecular nitrogen ($N_2$), and fuel impurities, such as hydrogen sulfide. For example, the oxidant can comprise 60.0 mole % to 95.0 mole % diluent and 5.0 mole % to 30.0 mole % molecular oxygen per mole of the oxidant, such as when the oxidant is air. Optionally, the oxidant has a mass ratio of diluent to molecular oxygen in the range of 0.5 to 20.0, e.g., in the range of 4.0 to 12.0.

At the end of regeneration mode, the reactor is switched to pyrolysis mode, typically by decreasing or terminating fuel and oxidant flow and commencing or increasing a flow of pyrolysis feed. Representative pyrolysis feeds and process conditions will now be described in more detail. The invention is not limited to these pyrolysis feeds, and this description is not meant to foreclose the use of other pyrolysis feeds.

Pyrolysis Mode

The pyrolysis feed typically comprises $C_{2+}$ hydrocarbon, $\geq 1$ wt. % of $C_{2+}$ hydrocarbon, such as $\geq 10$ wt. %, or $\geq 25$ wt. %, or $\geq 50$ wt. %, or $\geq 75$ wt. %, or $\geq 90$ wt. %. Typically $\geq 90$ wt. % of the remainder of the pyrolysis feed comprises diluent, e.g., one or more of methane, $CO_2$, water, etc. Suitable pyrolysis feeds include those disclosed in U.S. Patent Application Publication No. 2016-176781, which is incorporated by reference herein in its entirety. Also suitable are feeds which include components such as (i) saturated $C_{4+}$ hydrocarbon and/or (ii) aromatic and/or non-aromatic cores having one or more substantially-saturated $C_{2+}$ side chains. The feed can include a recycled portion of the pyrolysis product. Such recycle, when used, can include, e.g., methane, molecular hydrogen, and $C_{2+}$ hydrocarbon, typically $C_2$ to $C_5$.

The feed hydrocarbon can comprise volatile and non-volatile hydrocarbon, as described in U.S. Patent Application Publication No. 2016-176781. Although the feed hydrocarbon typically includes $C_{2+}$ compounds which contain hydrogen and carbon only, feed hydrocarbon can contain compounds having covalently-bound and/or non-covalently-bound heteroatoms. When present in the feed hydrocarbon, the amount of such heteroatom-containing hydrocarbon compounds is typically $\leq 10$ wt. % based on the weight of the feed's hydrocarbon. Feed hydrocarbon that is substantially-free of non-aliphatic hydrocarbon is within the scope of the invention, as is feed hydrocarbon that is substantially free of aromatic hydrocarbon and/or substantially free of olefinic hydrocarbon, particularly $C_2$-$C_5$ olefin. Substantially-free in this context means <1 wt. % based on the weight of the feed hydrocarbon, such as ≤0.1 wt. %, or ≤0.01 wt. % or ≤0.001 wt. %.

The feed hydrocarbon can be obtained from one or more sources of hydrocarbon, e.g., from natural hydrocarbon sources including those associated with producing petroleum, or from one or more synthetic hydrocarbons sources such as catalytic and/or non-catalytic reactions. Examples of such reactions include catalytic cracking, catalytic reforming, coking, steam cracking, etc. Synthetic hydrocarbon sources include those in which hydrocarbon within a geological formation has been purposefully subjected to one or more chemical transformations. The feed hydrocarbon can include one or more of ethane, propane, butanes, saturated and unsaturated $C_6$ hydrocarbon, including those derived from one or more of Fischer-Tropsch synthesis products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate, Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, $C_4$—residue admixture, naphtha—residue admixture, cracked teed, coker distillate streams, and hydrocarbon streams derived from plant or animal matter.

Diluent, when present, is typically included in the pyrolysis feed in an amount ≤60 wt. % based on the weight of the feed, e.g., ≤50 wt. %, such as ≤40 wt. %, or ≤30 wt. %, or ≤20 wt. %, or ≤10 wt. %, or in the range of from 10 wt. % to 50 wt. %. Diluent is also suitable for use as a sweep gas, e.g., for (i) removing at least a portion of any pyrolysis product in the reactor after the pyrolysis mode andlor after regeneration mode andlor (ii) adjusting the reactor's temperature profile—heat carried by the sweep gas from warmer regions of the reactor for transfer to cooler regions will increase the temperature of the cooler regions and further lessen or prevent sharp gradients in the reactor temperature profile.

Those skilled in the art will appreciate that feed flow rate will depend on factors such as feed composition, reactor volume, pyrolysis conditions, etc. Accordingly, the invention can be carried out over a very wide range of feed flow rates, e.g., at a flow rate ≥0.001 kg/s, such as ≥0.1 kg/s, or ≥10 kg/s, or ≥100 kg/s, or more.

A flow of the pyrolysis feed is conducted to the regenerative pyrolysis reactor during pyrolysis mode in an average flow direction (for convenience, "forward flow") that is substantially opposed to that of oxidant flow (for convenience, "reverse flow") as shown in FIG. 1. During pyrolysis mode, at least a portion of the feed hydrocarbon is pyrolysed to produce a pyrolysis product. Certain pyrolysis conditions that are useful for pyrolysing the specified pyrolysis feeds will now be described in more detail. The invention is not limited to these pyrolysis conditions, and this description is not meant to foreclose the use of other pyrolysis conditions.

The pyrolysis conditions in the pyrolysis zone during pyrolysis time interval $t_P$ generally include $T_P$≤1673K (1400° C.), $T_{av}$≤1473K (1200° C.), and an average total pressure ≥0 prig (1.01 bar). Total gas residence time in the pyrolysis zone is generally ≤0.4 seconds to decrease the conversion to coke of desired products such as light olefin. Typically, the pyrolysis conditions include $T_P$≤1473K, e.g., ≤1373K, such as ≤1273K or in the range of from 1273K to 1673K; $T_{av}$≤1373K, e.g., ≤1273K, such as ≤1173K, or in the range of from 1173K to 1373K, or 1198K to 1348K; and a feed hydrocarbon partial pressure ≥0.48 bar (48 kPa), or ≥0.69 bar (69 kPa), or ≥1.38 bar (138 kPa), or ≥2.07 bar (207 kPa). The average total pressure is typically ≥0.34 barg (34 kPag), or ≥1.03 barg (103 kPag), or ≥2.76 barg (276 kPag), or ≥5.52 barg (552 kPag), or ≥8.27 barg (827 kPag). Particularly when the pyrolysis feed includes diluent, the average total pressure can be ≥10.34 barg (1034 kPag), or ≥20.68 barg (2068 kPag), or ≥34.47 barg (3447 kPag). Total gas residence time in the pyrolysis zone is typically ≤0.2 second; preferably ≤0.15 second or ≤0.1 second; or in the range of 0.001 second to 0.4 second, or in the range of 0.01 second to 0.4 second, or in the range of 0.01 second to 0.2 second. For example, the pyrolysis feed can be passed through thermal mass 1 at a total gas residence time at a bulk gas temperature ≥800° C. that is ≤0.100 second, such as ≤0.060 second, such as ≤0.040 second, or in the range of 0.001 second to 0.100 second, or in the range of 0.002 second to 0.060 second, or in the range of 0.002 second to 0.040 second. Typically $T_P$ and/or $T_{av}$ decrease by ≤100K, e.g., ≤75K, such as ≤50K, or ≤25K, or ≤10K, or ≤5K, for a $t_P$≥1 second, e.g., ≥2 seconds, such as ≥5 seconds, or ≥10 seconds, or ≥20 seconds, or ≥30 seconds, or even ≥1 minute or more. Although high-severity pyrolysis conditions can be used, it is typical to use low severity conditions. Regions of substantially-constant temperature along the length of the pyrolysis zone are typically avoided. Sharp gradients in the bulk gas temperature profile within the pyrolysis zone are also typically avoided.

When it is desired to keep $T_P$ and/or $T_{av}$ from decreasing by no more than about 100K, and preferably ≤75K during $t_P$, the OFA of at least thermal mass 1 should be ≤55%, e.g., ≤45%, such as ≤40%, or ≤35%. Typically, the OFA of thermal mass 1 is in the range of about 10% to 55%, e.g., 10% to 50%. such as 10% to 45%. or 10% to 35%. Smaller values of OFA, which lead to a smaller decrease in the temperatures $T_P$ and $T_{av}$ during $t_P$, are typically desired at relatively large values of $T_P$, e.g., ≥1273K, such as ≥1473K, or ≥1573K. For example, when $T_{av}$ exceeds 1173K, it is beneficial for the thermal mass to have an OFA of ≤45%. When $T_{av}$ exceeds 1273K, it is beneficial for the thermal mass to have an OFA of ≤35%, and when $T_{av}$ exceeds 1373K, it is beneficial for the thermal mass to have an OFA of ≤25%. Stated another way, when $T_P$ exceeds 1273K, it is beneficial for $\Delta T_P$ and/or $\Delta T_{av}$ to be ≤50K, when $T_P$ exceeds 1372K, it is beneficial for $\Delta T_P$ and/or $\Delta T_{av}$ to be ≤40K, and when $T_P$ exceeds 1473K, it is beneficial for $\Delta T_P$ and/or $\Delta T_{av}$ to be ≤20K.

The duration of pyrolysis mode operation $t_P$ can be, e.g., ≥1 second, such as ≥2 seconds, or ≥5 seconds, or ≥10 seconds, or ≥20 seconds, or ≥30 seconds, or even ≥1 minute or more. For example, $t_P$ can be in the range of from 1 second to 30 seconds, e.g., 2 seconds to 15 seconds, such as 2 seconds to 10 seconds. Optionally, conventional methods are used to achieve these ranges of $t_P$, e.g., using one or more poppet valves and/or hydrodynamic valving to regulate the flows of feed and process gas during pyrolysis mode and the flows of heating mixture and combustion product during regeneration mode.

The reactor's bulk gas temperature profile typically maintains a substantially constant shape (although decreasing in magnitude) during these relatively long $t_P$ values. Referring again to FIG. 3, the solid line represents the bulk gas temperature profile at the start of pyrolysis mode ($t_1$), and the dashed line represents the bulk gas temperature profile at the end of pyrolysis mode ($t_2$). At any time during the pyrolysis variations in the bulk gas temperature are typically ≤140K within any pyrolysis zone segment having a length ≤10% of $l_C$, e.g., ≤100K, such as ≤50K. Typically, temperature variations are ≤75K within any segment of thermal mass 1 that has a length ≤10% of $l_B$, e.g., ≤50K, such as ≤25K. In certain aspects, the peak gas temperature $T_P$ during pyrolysis is displaced away from the reactor's center. For example, the length of the pyrolysis zone's downstream segment $l_A$ is less than that of the upstream segment $l_B$, e.g., at least 10% less, such as at least 25% less, or at least 50% less. The total length of the pyrolysis zone $l_C$ is the sum of $l_A$ and $l_B$. Typically, $l_C$ is in the range of from 10% to 50% of the total length of reactor 50, e.g., in the range of 20% to 40%. For example, can be in the range of from 20% to 40% of $L_1+L_2+L_3+L_4$. The locations of the terminal ends of $l_A$ and $l_B$ are determined by the minimum temperature $T_{MIN}$ needed for appreciable (≥10 wt. %) conversion of the selected feed under the specified pyrolysis conditions, e.g., $T_{MIN}$ in the range of 773K to 1273K.

In certain aspects, the bulk gas temperature profile at the start of pyrolysis increases substantially monotonically as shown in FIG. 3 from a first temperature ($T_1$) proximate to the first aperture 3 of thermal mass 1 to a second temperature ($T_2$) proximate to the second aperture 5. The peak gas temperature $T_P$, located at a position that is at or downstream of face 5, is greater than $T_2$. $T_P-T_2$ at the start of pyrolysis is typically in the range of from 10K to 400K, or 25K to 300K, or 50K to 200K. $T_P$ decreases during the pyrolysis by an amount ($\Delta T_P$) that is ≤100° C. Typically, the location of $T_P$ within the pyrolysis zone remains substantially constant during the pyrolysis. Substantially constant in this context means that the location of $T_P$ changes during pyrolysis mode from its initial position by ≤+/−20% of $l_c$, e.g., ≤+/−15%, such as ≤+/−10%, or typically ≤+/−5%. $T_1$ is less than $T_2$ during pyrolysis, e.g., $T_1$ at the start of pyrolysis can be ≤1673K, e.g., ≤1573K, such as ≤1473K, or ≤1373K, or ≤1273K, $T_2-T_1$ at the start, of pyrolysis is typically in the range of from 50K to 500K, such as from 100K to 400K, or 100K to 300K. In particular aspects, the pyrolysis conditions at the start of pyrolysis include $T_1$≤1173K, e.g., ≤1023K, such as ≤773K; $T_2$ in the range of from 1248K to 1373K, $T_P$≥1423K, and $T_{MIN}-T_1$ in the range of from 10K to 400K, or 25K to 300K, or 50K to 200K. Although the bulk gas temperature profile at the start of $t_P$ is substantially congruent with that at the end of $t_P$, the location in the pyrolysis zone at which appreciable pyrolysis is achieved translates during $t_P$ from reference position $R_1$ toward aperture 5 to reference position $R_2$ at the end of $t_P$ ($t=t_2$). At $t_2$ the bulk gas temperature profile increases substantially monotonically from a first temperature ($T_3$) proximate to first aperture 3 to a second temperature ($T_4$) proximate to the second aperture 5. $T_3$ is ≤$T_1$ and $T_4$ is in the range of from $T_2$ to ($T_2$−100K), e.g., $T_2$ to ($T_2$−75K), such as $T_2$ to ($T_2$−50K). The reference location $R_1$ is positioned, e.g., within 0.2*$L_1$ and 0.4*$L_1$ of the second aperture.

The process gas conducted away from the reactor during pyrolysis mode comprises a range of desired hydrocarbon products, including a desirable range of $C_2$-$C_5$ olefin. Typically, one or more of the desired hydrocarbon compounds is separated from the process gas, e.g., for storage and/or further processing. Typically, the process gas comprises molecular hydrogen; methane; ethane; ethylene; propane; propylene; butanes; butenes; butadiene; $C_5$ hydrocarbon, including normal, iso, and cyclo $C_5$ olefin and paraffin, and $C_{6+}$ hydrocarbon, including aromatics and normal, iso, and cyclo $C_{6+}$ olefin and paraffin. For example, particularly when the teed includes ethane, the pyrolysis product can comprise 2 wt. % to 10 wt. % methane, 50 wt. % to 95 wt. % ethylene, 0.2 wt. % to 1 wt. % propylene, 0.1 wt. % to 5 wt. % butadiene, and up to about 3 wt. % benzene, based on the weight of the pyrolysis product. As may be appreciated, these very desirable compositional ranges for the identified hydrocarbon compounds are achieved not only at the start of pyrolysis mode, but during the duration of $t_P$.

The process gas is compressed in at least one compression stage which includes at least one process gas compressor. The process gas compressor utilizes at least a portion of the first and second shaft powers produced by the power generator. Suitable process gas compressors will now be described in more detail. The invention is not limited to these compressors, and this description is not meant to foreclose the use of other compressors within the broader scope of the invention.

Representative Process Gas Compressor

In the compressor stage, the process gas is typically compressed to pressure in the range of from 20 bar (2000 kPa) to 40 bar (4000 kPa) in a centrifugal compressor powered by shaft power. Typically, the process gas compressor includes at least four sections, with each section in sequence providing an increase in pressure over its preceding sections. Cooling is typically employed between the sections, e.g., to prevent compressor damage, to prevent fouling resulting from diolefin polymerization, and to facilitate separation of process gas constituents. The invention is compatible with conventional process gas compressors, but the invention is not limited thereto.

A power plant that is substantially independent energetically of the pyrolysis reactor will now be described in more detail. The invention is not limited to this power plant, and this description is not meant to foreclose other power plants within the broader scope of the invention, such as those which have an energetic link to the pyrolysis furnace, e.g., by way of an exchange of steam.

Power Plant

The power plant produces tint and second shaft powers for powering the process gas compressor. Typically, the first shaft power is produced by expanding a first working fluid in a first turbo-expander, e.g., the expansion stage of a fuel-fired turbine. It is also typical for the second shaft power to be produced by expanding a second working, fluid, e.g., by depressurizing steam in a steam turbine.

The first shaft power can be produced by a fuel-fired turbine having a compression stage, a combustion stage, and an expansion stage. A flow of a first working fluid comprising oxidant is established to the compressor stage which compresses the first working fluid. A flow of fuel is established to the combustion stage for combustion of at least a portion of the fuel with at least a portion of the compressed working fluid's oxidant to produce a heated effluent. The heated effluent is expanded in the expansion stage to produce a decompressed effluent and the first shaft power. A second working fluid that is at least partially in the liquid phase can be used to produce the second shaft power. The second working fluid can be conducted to a heat transfer stage for a transfer of heat from the decompressed effluent to the second working fluid. The transferred heat vaporizes at least a portion of the second working fluid's liquid phase.

At least a portion of the vaporized second working fluid is depressurized in a second expansion stage to produce the second shaft power.

The first working fluid typically comprises one or more of air, oxygen in air, oxygen obtained from air, oxygen-enriched air, oxygen-depleted air, etc. For example, the first working fluid can comprise ≥50 wt. % air based on the weight of the first working fluid, e.g., ≥75 wt. %, such as ≥90 wt. %. The second working fluid typically comprises water, e.g., ≥50 wt. % water based on the weight of the first working fluid, e.g., ≥75 wt. %, such as ≥90 wt. %. The fuel is generally one that is compatible with the fuel-fired turbine. Suitable filels include those specified for pyrolysis reactor regeneration, e.g., a fuel having a heating value ≥1×10$^6$ J/kg. When the fuel-fired turbine is a gas turbine, the fuel is typically one that is at least partially gaseous under the conditions used for introducing the fuel into the gas turbine's combustion stage. For example, the fuel can comprise one or more of natural gas, gaseous hydrocarbon in the natural gas, gaseous hydrocarbon separated from the natural gas and/or derived from the natural gas, gaseous hydrocarbon separated from the natural gas condensate and/or derived from the natural gas condensate, gaseous hydrocarbon separated from the crude oil and/or derived from the crude oil, molecular hydrogen, carbon monoxide, and mixtures thereof.

Figure 4:
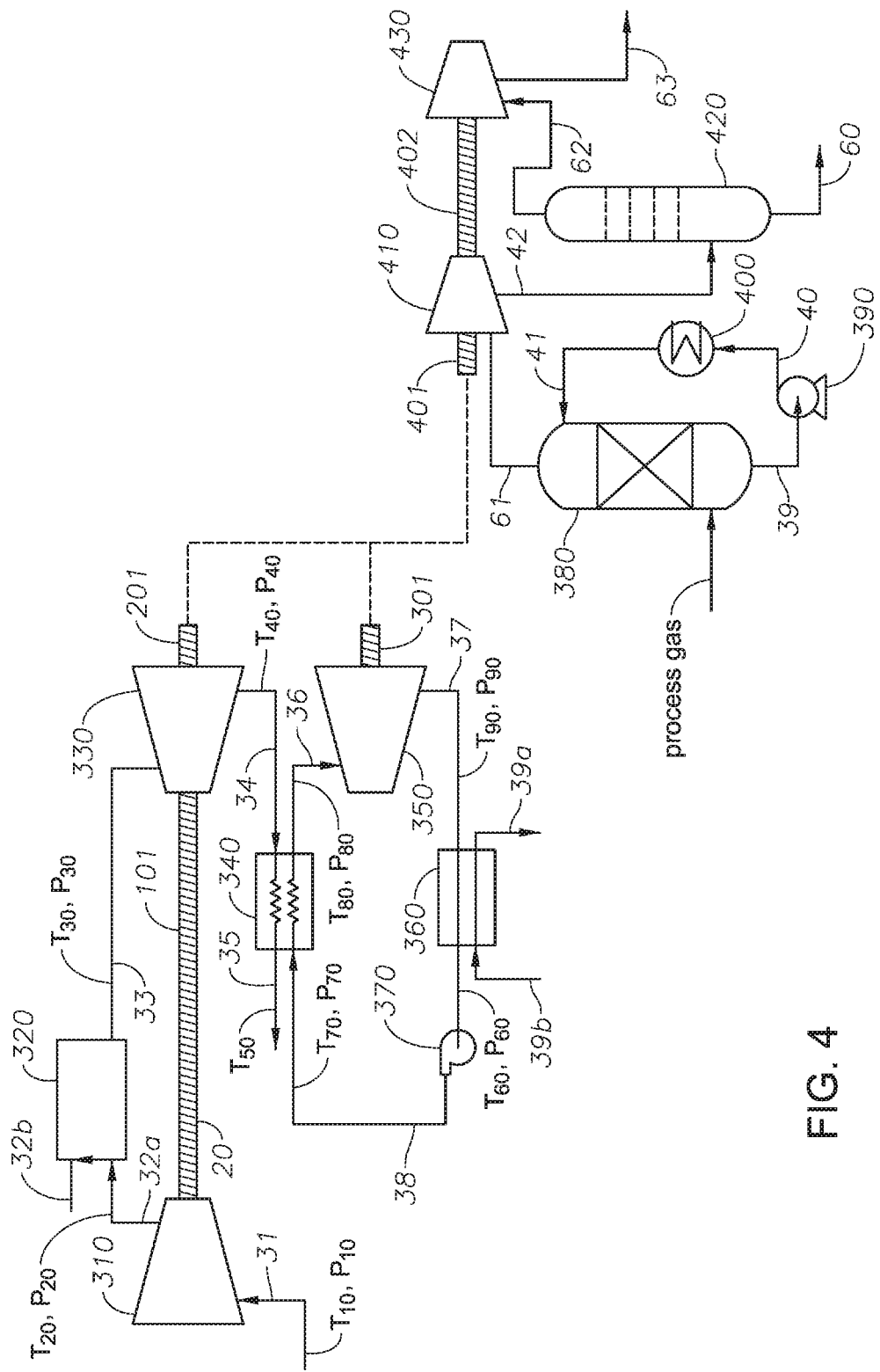
FIG. 4 schematically shows certain aspects of the invention in which a process gas produced derived from hydrocarbon pyrolysis product is compressed in a process gas compressor using first and second shaft powers produced in a power generator.

An example of a suitable power plant is shown schematically in FIG. 4. A compressible first working fluid comprising oxidant, e.g., atmospheric air, is conducted via line 31 to the inlet of compression stage 310. Power for the compressor stage is provided by at least one rotating shaft 101. The compressed working fluid is conducted away from the compressor stage via line 32a to combustion stage 320. A fuel in line 32b is also conducted to the combustion stage. At least a portion of the fuel is combusted with at least at portion of the first working fluid's oxidant to produce heat, which increases the first working fluid's temperature. Effluent from the combustion stage is conducted via conduit 33 to a first expansion stage 330, wherein the expansion of the working fluid produces power by rotating shaft 101. An effluent comprising depressurized first working fluid is conducted away from the expansion stage via line 34 to first heat transfer stage 340 for a transfer of heat to the second working fluid. The first working fluid is conducted away via line 35. A portion of the work done by the first working fluid in the first expansion stage is transmitted as shaft work on shaft 101 for powering the compression stage. Additional shaft work is provided by shaft 201, e.g., for powering the process gas compressor and optionally for powering other equipment such as one or more electric generators for producing electricity. Although it is typically convenient to configure the fuel-fired turbine in an "open-cycle" configuration, as shown in FIG. 4, closed cycle operation, and combinations of closed/open cycle operation are also within the scope of the invention.

Approximate values for thermodynamic parameters such as working fluid temperature, pressure, fuel and working fluid flow rates, heat transfer, power generated by the expansion stage, power consumed by the compression stage, the amount of heat added by the combustion stage, and the amount of heat withdrawn by the first heat transfer stage can be determined for an idealized gas turbine in accordance with the Brayton Cycle. The thermodynamic parameters can be evaluated, e.g., using the methods disclosed in *Energy Conversion*, Kenneth W. Weston, Brooks/Cole, 1992. The Brayton Cycle includes an isentropic compression of the first working fluid (where work $W_c$ is done on the first working fluid), an isobaric transfer of heat to the first working fluid, an isentropic expansion of the heated first working fluid (where work $W_t$ is done by the first working fluid), and then an isobaric transfer of heat from the first working fluid. The difference between the absolute values of the work done by the first working fluid during the expansion and the work done on the first working fluid during the compression [$|W_t|-|W_c|$] is the cycle's net work. At least part of the net work done by the first working fluid is delivered via an output shaft 201 as shaft work for powering the process gas compressor.

The second working fluid is used for producing the second shaft power. Referring again to FIG. 4, a second working fluid such as pressurized water that is at least partially in the liquid phase is provided via line 38 to first heat transfer stage 340. Heat transferred from the first working fluid heats the second working fluid, which vaporizes at least part of the second working fluid's liquid. When the second working fluid is water, the vapor is typically superheated steam. The vapor is conducted via line 36 to second expansion stage 350. The vapor is expanded in the second expansion stage to produce a second shaft power 301 and a depressurized second working fluid vapor, e.g., saturated steam. The depressurized second working fluid vapor is conducted via line 37 to a second heat transfer stage (e.g., condenser 360) for cooling against a cooling medium (e.g., boiler feed water) introduced via line 39b and conducted away via line 39a. The condensed, depressurized second working fluid is re-pressurized in pump 370, and the pressurized second working fluid (e.g., pressurized water) is returned to first heat transfer stage 340 via line 38. Second shaft power is available via shaft 301 for powering the process gas compressor, and optionally for powering other equipment, e.g., pump 370.

The invention is not limited to any particular turbine technology. Conventional steam turbine technology can be used, as can conventional fuel-fired turbine technology (e.g., gas turbine technology). The invention is compatible with turbine improvements, e.g., improvements to gas turbine mechanical, thermal, and chemical efficiencies. For example, gas turbine efficiency can be improved by including lines 31, 32a, 32b, 33, and 34; compression stage 310; first expansion stage 330; and shaft 101 in a single gas turbine unit. The invention is also compatible with improvements in the chemical efficiency of turbine processes, e.g., (i) by upgrading fuel to the combustion stage in order to increase heat output during combustion, as disclosed in U.S. Pat. No. 5,669,216 which is incorporated by reference herein in its entirety, and/or (ii) by combusting oxidant remaining in the depressurized first working fluid with additional fuel in a burner located proximate to one or more steam cracking furnaces, as disclosed in U.S. Pat. No. 4,287,377, which is incorporated by reference herein in its entirety.

Continuing with FIG. 4, process gas (e.g., from line 49 of FIGS. 1 and 2) is conducted to cooling stage 380 (typically a quench tower or combined quench tower-primary fractionator) to produce a cooled process gas, which is conducted away via line 61. Water is a typical quench medium, which can be recovered via line 39, pressurized in pump 390, conducted to cooler 400 via line 40, and returned to the cooling stage via line 41. Cooled process gas is initially pressurized in compressor stages 410, which typically include at least three stages of increasing compression and inter-stage cooling. Pressurized process gas from the compressor stages 410 is conducted via line 42 to process gas upgrading equipment, typically caustic and/or amine treatment, shown schematically as tower 420. Spent treatment medium (e.g., spent caustic) is conducted away via line 60. Upgraded process gas is conducted via line 62 to second compression stages 430 for further pressurization. Typically, stages 410 and 430 are joined by rotating shaft 402, which may be joined to rotating shaft 401 for powering these stages. Shaft 402 obtains at least a portion of its shaft power from shafts 201 and 301 as shown by the broken line interconnecting these shafts. This can be accomplished by (i) a direct transfer of rotational energy, e.g., via a rotational power transmission; (ii) an indirect transfer, e.g., by powering an electric generator with shaft 201 and/or 301, driving an electric motor with at least a portion of the electric power produced by the generator, and using the motor to power shaft 401; and (iii) a combination of direct and indirect power transmission. Compressed process gas is conducted away via line 63 for storage and/or further processing, e.g., drying, acetylene conversion, and recovery of products such as ethylene.

EXAMPLES

Example 1 (Comparative)

Figure 5:
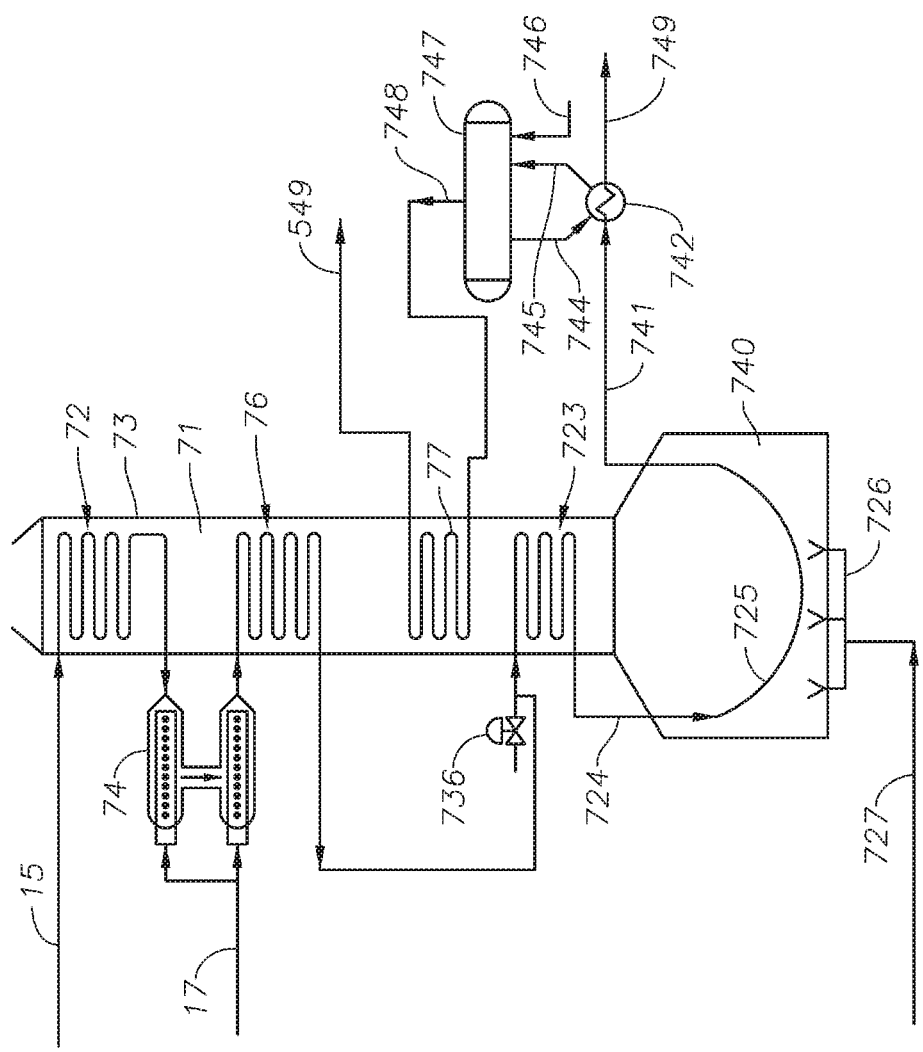
FIG. 5 schematically shows a conventional process for producing a process gas and steam in a steam cracking furnace.

In this prophetic example, a feed consisting essentially of ethane is conducted via feed line 15 at a rate (dm/dt) of 960,000 pounds/hr (121 kg/s) to a conventional steam cracker furnace 73 as shown in FIG. 5. The steam cracker furnace comprises convection section 71 and radiant section 740. The feed is preheated in convection tube 72. Dilution steam from line 17 is introduced into the preheated feed in steam sparger 74. The steam-feed mixture is heated in second convection tube 76. If needed, supplemental dilution steam is introduced into the steam-fuel mixture via valve 736. The feed-steam mixture is exposed to additional heating in convection tube 723. Cross-over piping 724 is used to convey the pre-heated feed-steam mixture to radiant tube 725 located in radiant section 740. The radiant section is heated by a plurality of burners 726 utilizing fuel comprising natural gas conveyed via line 727. Although one convection tube and one radiant tube are shown in the convection and radiant sections, those skilled in the art will appreciate that this is a simplification. In commercial practice, a plurality of such tubes would be used. A pyrolysis product is conducted away from the radiant coil via line 741 to TLE 742, which cools the pyrolysis product to produce the process gas. The process gas is conducted away via line 749.

Conventional steam cracker process conditions are used in the convection and radiant sections. The inlet temperature of radiant tube 725 is in the range of from 923K to 953K, and the outlet temperature is in the range of from 1048K to 1148K. Radiant tube outlet pressure is in the range of from 1.65 bar to 2.25 bar. Ethane:steam mass ratio in radiant tube 725 is in the range of from 0.25 to 0.35. Ethane conversion is in the range of from 60% to 70% on a mass basis. Feed residence time in the radiant tube is in the range of from 0.1 second to 0.5 second. The hydrocarbon part of the process gas comprises 2% to 5% methane, 50% to 55% ethylene, and 30% to 35% ethane, all on a mass basis. Approximately 148 MW of shaft power is needed to power the recovery facility's turbo-machinery, including turbo-machinery needed for process gas compression stages 410 and 430 (FIG. 6), refrigerant compressors (not shown), etc., (collectively "process gas compressor").

The pyrolysis product is cooled in the TLE by an indirect transfer of heat to water thermally siphoned from steam drum 747 at a temperature of about 310° C. and a pressure of about 100 bar. Saturated steam produced by the transferred heat is returned to the steam drum via line 745. Saturated steam from steam drum 747 is conducted via line 748 to superheater tube 77. Superheated steam is conducted away via line 549 at a temperature of about 773K. The steam drum is replenished by introducing pressurized water via line 746.

Figure 6:
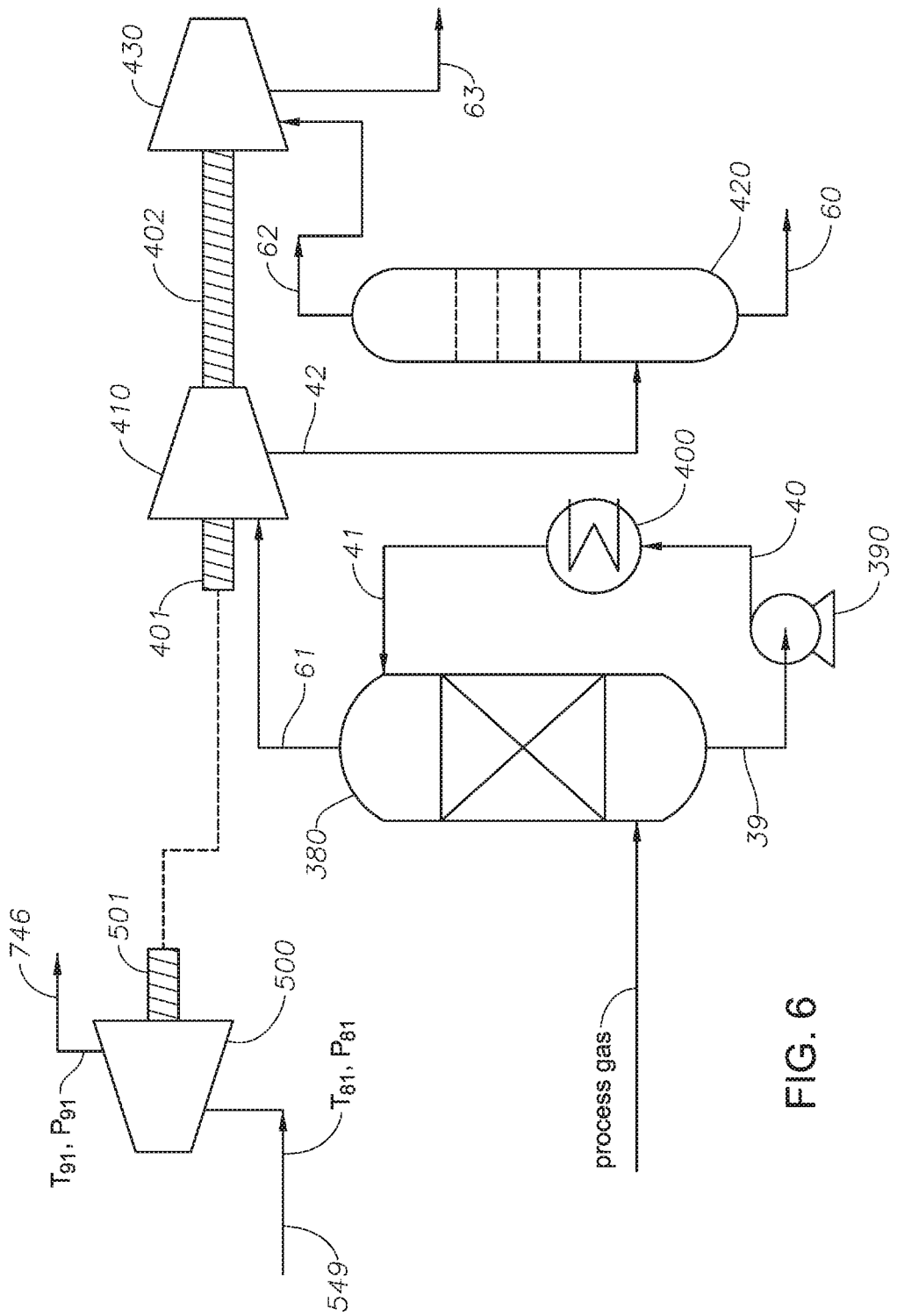
FIG. 6 schematically shows a conventional process for decompressing expanded steam to produce shaft power which is used for process gas compression.

Referring now to FIG. 6, superheated steam at a pressure $P_{81}$ of 100 bar and a temperature $T_{81}$ of 773K is conducted from line 549 to steam turbine 500 at a flow rate of 137 kg/s for powering shaft 501. Saturated steam at a pressure $P_{91}$ of 0.05 bar and $T_{91}$ of 306K is condensed (not shown) to produce water. The condensed water is pressurized (not shown) isothermally to 100 bar and returned to steam drum 747 via line 746. Features identified by like index numbers in FIGS. 4 and 6 perform similar functions.

The shaft power $(dW_T/dt)$ produced by turbine 500 is obtained from inlet and outlet values of the working fluid's enthalpy using the equation $(dW_T/dt)=(dm/dt)*(h_{81}-h_{91})$. The inlet value $h_{81}$ is obtained from conventional steam tables and is equal to 3374 kJ/kg. The outlet value $h_{91}$ is approximated from the equation $h_{91}=h_f+(x_{91}*h_{fg})$, where $h_f=138$ kJ/kg and $h_{fg}=2424$ kJ/kg (both values from the stream tables), and $x_{91}$ is the dryness factor of the saturated steam exiting turbine 500. The dryness factor can be approximated using the equation $x_{91}=(S_{91}-S_f)/S_{fg}$. Since the expansion of the working fluid (the steam) in steam turbine 500 is thermodynamically reversible, the entropy of the superheated steam $S_{81}$ is substantially the same as the entropy of the saturated steam $S_{91}$, and can be obtained from the steam tables ($S_{81}=6.5965$ kJ/kgK). $S_f$ and $S_{fg}$ can also be obtained from the steam tables, and have the values $S_f=0.4763$ kJ/kgK, and $S_{fg}=7.92$ kJ/kgK. Accordingly, dryness factor $x_{91}=0.773$ and $h_{91}=2011$ kJ/kgK. The shaft power of shaft 501 produced by steam turbine 500 is therefore $=(dm/dt)*(h_{81}-h_{91})=187$ MW, which is sufficient for powering process gas compressor stages 410 and 430, with additional shaft power available for other uses. The shaft power of shaft 501 is produced at a cost of additional firing of burners 726 of the steam cracker furnace, which additional firing is needed to convert the 137 kg/s of condensed water at 0.05 bar and 306K (h=138 kJ/kg) flowing into line 746 from turbine 500 to the same mass of superheated steam introduced into line 549 from superheater 77. 44 MW of additional furnace firing is needed (137 kg/s*[3374 kJ/kg−138 kJ/kg]=443 MW), yielding a steam turbine efficiency of about 0.42.

Shaft 501 directly powers shaft 401, which powers the first and second compressor stages 410 and 430. Accordingly, the process gas is quenched in quench tower 380 to produce a cooled process gas, which is conducted away via line 61. Water is recovered via line 39, pressurized in pump 390, conducted to cooler 400 via line 40, and returned to the quench tower via line 41. Cooled process gas is initially pressurized in compressor stages 410, which typically include at least three stages of increasing compression and inter-stage cooling. Pressurized process gas from the compressor stages 410 is conducted via line 42 to process gas upgrading equipment, typically caustic and/or amine treatment, shown schematically as tower 420. Spent caustic solution and/or spent amine solution is conducted away via one or more lines 60. Upgraded process gas is conducted via line 62 to second compression stages 430 for further pressurization. Stages 410 and 430 are joined by rotating shaft 402, which is joined to rotating shaft 401 for powering these compressor stages. The steam turbine provides the shaft power for compressor stages 401 and 402 by way of a direct connection between shafts 501 and 401, as shown by the broken interconnecting line, and to shafts consuming any additional shaft power (not shown). Compressed process gas is conducted away for further processing, including drying, acetylene conversion, and recovery of products such as ethylene.

Example 2

In this prophetic example, Example 1 is repeated, except that a power plant operating in accordance with the invention is substituted for steam turbine 500. Although (i) saturated steam is still withdrawn (for other uses, not shown) from steam drum 747 of FIG. 5 in order to heat balance TLE 742 and (ii) make-up water is provided via line 746 for these uses, superheater 77 is omitted as is the additional make-up water that would otherwise be superheated and conducted to compressor 500 (FIG. 6). Referring again to FIG. 4, 400 kg/s of air is introduced as the first working fluid into compressor stage 310 at a temperature $T_{10}$ of 300K and a pressure $P_{10}$ of 1 bar. The air is compressed to a pressure $P_{20}$ of 5 bar, which heats the air to a temperature $T_{20}=T_{10}*(P_{20}/P_{10})^{(\gamma-1)/\gamma}$, with $\gamma=1.4$ (approximate value for air). Accordingly, $T_{20}$=475K. Using the approximate value for the heat capacity of air at constant pressure, $C_P$=1.005 kJ/(kg*K), the shaft power needed to compress the air can be determined from the relationship $(dW_c/dt)=C_P*(dm_{air}/dt)(T_2-T_1)$=70 MW.

The heated air is conducted to combustion stage 320. 7.8 kg/s of natural gas fuel (heating value 42 MJ/kg) is conducted to the combustion stage for combustion with a portion of the heated air to produce 330 MW rate of heat addition. Temperature $T_{40}$ of the air is obtained using the equation $dQ/dt=330$ MW$=(dm_{air}/dt)*C_P*(T_{30}-T_{20})$, which yields $T_{30}$=1300° K (approximately 1000° C.). The relatively small mass of the fuel can be ignored. The heated effluent from the combustion includes air, any un-combusted fuel, and combustion products. Since the masses of un-combusted fuel and combustion products is relatively small compared to the mass of heated air, the heated effluent is considered to be heated air. The heated air is expanded in expansion stage 330 to produce depressurized air at a pressure $P_{40}$ of 1 bar and a temperature $T_{40}$. $T_{40}$ can be determined using the formula $T_{40}=T_{30}*(P_{40}/P_{30})^{(\gamma-1)/\gamma}$=820K. The first shaft power (shaft 201) produced in expansion stage 330 can be determined from the equation $dW_e/dt=(dm_{air}/dt)*C_P*(1300K-820K)$=192 MW. The depressurized air is conducted to heat recovery steam generator 340 for a transfer of heat from the air to the second working fluid (water) to produce steam.

A flow of water at a rate of 50 kg/s is supplied to the heat recovery steam generator via line 38 at a temperature pressure $P_{70}$=50 bar and a temperature $T_{70}$. An isobaric transfer of heat in the heat recovery steam generator from the air of line 34 to the water of line 38 increases the temperature of the water to $T_{80}$=773K (about 500° C.). Enthalpy $h_{80}$ at the inlet of steam turbine 350 can be found in the steam tables ($h_{80}$=3434 kJ/kg). The steam is depressurized to a pressure $P_{90}$ in expansion stage 350, to produce second shaft power $(dW_e/dt)$ at shaft 301. Enthalpy $h_{90}$ of the depressurized steam at the outlet of the steam turbine is determined from the equation $h_{90}=h_f+[(x_{90})*h_{fg}]$, where dryness $x_{90}$ is determined from the equation $x_{90}=(S_{90}-S_f)/S_{fg}$. Since (in accordance with the Brayton cycle) entropies $S_{90}$ and $S_{80}$ are approximately equal, then dryness factor $x_{90}$=0.826, where the values of $S_f$ (0.521 kJ/kgK) and $S_{fg}$ (7.812 kJ/kgK) are obtained from the steam tables. Accordingly, $h_{90}$=138 kJ/kg+(0.826*2424 kJ/kg)=2140 kJ/kg. The depressurized steam is conducted via line 37 to condenser 360 which condenses the steam to produce condensed water ($P_{60}$=0.05 bar; $h_{60}$=138 kJ/kg-from the steam tables) and then to pump 370 which produces the pressurized water for heat recovery steam generator 340. Pressure $P_{70}$=50 bar (compressed water). Since the pumping is thermodynamically reversible, enthalpy $h_{70}$ can be approximated by the equation $h_{70}=h_{60}[vf_{60}*(P_{70}-P_{60})]$=138 kJ/kg+[0.001*(5000-5) kJ/kg]=143 kJ/kg; where the specific volume $vf_{60}$ is obtained from the steam tables. The temperature of the depressurized air ($T_{50}$) can be obtained by solving the equation $(dm_{air}/dt)*C_P*(T_{40}-T_{50})=(dm_{steam}/dt)*(h_{80}-h_{70})$, which yields $T_{50}$=408K (136° C.).

The second shaft power which is produced by steam turbine 350 can be determined from the equation $dW_T/dt=(dm_{steam}/dt)*(h_{80}-h_{90})$=50 (3434−2140) MW=65 MW. A portion of the second shaft power is used for driving pump 370, which consumes shaft power $(dW_P/dt)=(dm_{steam}/dt)*(h_{80}-h_{90})$=0.25 MW. The total shaft power consumed by the power plant's compressor stage 310 and pump 370 is thus 70 MW+0.25 MW, or about 70 MW. The gross shaft power produced by the power plant is $(dW_T/dt)+(dW_e/dt)$=192 MW+65 MW=257 MW. The net shaft power (first shaft power+second shaft power)=257 MW−70 MW=187 MW. Power plant efficiency=187 MW/330 MW=0.56, is much larger than the efficiency of steam turbine 500 of Example 1 (0.42). Efficiency can be further increased by (i) conducting at least a portion of the heated air (with combustion products) of line 35 to the steam cracker furnace of FIG. 4 and/or (ii) combining at least a portion of the heated air with the air of line 31 (FIG. 3). Since the power plant obviates the need for additional superheating (the steam of line 549 is not used in this Example 2), the furnace and recovery sections of the steam cracker plant are energetically independent. The firing of combustion stage 320 can be maintained, even if one or a plurality of steam crackers providing process gas via line 49 becomes unexpectedly idle, obviating the need for additional steam generators that would be needed should the same difficulty arise in Example 1. Maintenance of the gas turbine (stages 310, 320, and 330) can be carried out without interrupting steam cracker operation by temporarily driving the process gas compressor with one or more electric motors (not shown). Much less water circulates through the steam turbine of Example 2 compared to that of Example 1, and a much smaller (and lower pressure) pump can be used.

Example 3

In Example 2, the power plant obviates the need for the additional superheating utilized for powering the process gas compressor of prophetic Example 1, but TLE 742 and steam drum 747 are still needed for cooling the pyrolysis product of line 741 to produce the process gas of line 49. In this prophetic Example 3, the reverse-flow thermal pyrolysis reactor of FIG. 2 is substituted for the steam cracker of FIG. 5. Since the reverse-flow thermal pyrolysis reactor cools the pyrolysis product using a transfer of heat within the reactor, a TLE and steam drum are not needed to produce the process gas of line 49.

Accordingly, in this prophetic Example 3, a feed consisting essentially of ethane is conducted via feed line 15 at a rate (dm/dt) of 960,000 pounds per hour (121 kg/s) to the reverse-flow thermal pyrolysis reactor as shown in FIG. 2. At least one additional (and substantially similar) thermal pyrolysis reactor (a second reactor, not shown) is used in parallel with the reverse-flow reactor of FIG. 2 (the first reactor). The second reactor operates in regeneration mode while the first reactor operates in pyrolysis mode. When the first reactor is switched to regeneration mode, the second reactor is switched to pyrolysis mode, thus avoiding any substantial interruption in the delivery of process gas to the process gas compressor. The pyrolysis conditions in the pyrolysis zone are low-severity conditions which include a $T_P \leq 1200°$ C., and a feed hydrocarbon partial pressure $\geq 0.48$ bar (48 kPa). The average total pressure is $\geq 0.34$ barg (34 kPag), and the average total pressure is $\leq 10.34$ Barg (1034 kPag). Total gas residence time in the pyrolysis zone is $\leq 0.2$ second. $T_P$ and $T_{av}$ each decrease by $\leq 100°$ C. during the pyrolysis, and $t_P \geq$ is 1 second. Regions of substantially-constant temperature along the length of the pyrolysis zone are avoided. Sharp gradients in the bulk gas temperature profile within the pyrolysis zone are also avoided.

As in Examples 1 and 2, ethane conversion in this Example 3 is in the range of from 60% to 70% on a mass basis, and the process gas comprises 2% to 5% methane, 50% to 55% ethylene, and 30% to 35% ethane, all on a mass basis. Approximately 187 MW of shaft power is needed to compress the process gas in process gas compressor stages 410 and 430 (FIG. 4) to facilitate product separations and recovery. As in Example 2, net shaft power (first shaft power+second shaft power)=257 MW−70 MW=187 MW, and the power plant efficiency=187 MW/330 MW is 0.56. Accordingly, this configuration obviates the need for the TLE of Example 2 without a significant loss in thermal efficiency.

All patents, test procedures, and other documents cited herein, including priority documents, are fully incorporated by reference to the extent such disclosure is not inconsistent. It is not intended that the scope of the claims appended hereto be limited to the descriptions set forth herein but rather that the claims be construed as encompassing all patentable features which reside herein, including all features which would be treated as equivalents thereof by those skilled in the relevant art. When lower and upper limits are specified, ranges from any lower limit to any upper limit are expressly within the scope of the invention. The term "comprising" is synonymous with the term "including". When a composition, an element or a group of components is preceded with the transitional phrase "comprising", the same composition or group of components is within transitional phrases "consisting essentially of," "consisting of," "selected from the group of consisting of," or "is" preceding the recitation of the composition, component, or components, and vice versa. Pressure values are absolute (bar, kPa, psi, or psia) unless expressly indicated as gauge (barg, kPag, psig).

The invention claimed is:

1. A hydrocarbon pyrolysis process, the process comprising:
   (a) providing a feed, a fuel, first and second working fluids, a tubular flow-through reactor, a power generator, and a process gas compressor, wherein
      (i) the feed comprises hydrocarbon, the first working fluid comprises oxidant, and at least a portion of the second working fluid is liquid,
      (ii) the flow-through reactor has an internal volume, and
      (iii) the power generator includes a compressor stage, a combustion stage, first and second expansion stages, and a heat transfer stage;
   (b) producing a process gas by establishing a flow of the feed into the internal volume of the flow-through reactor, and pyrolysing at least a portion of the feed in the internal volume under pyrolysis conditions, to produce a flow of a process gas comprising light olefin;
   (c) generating first and second shaft powers by at least:
      (i) establishing a flow of the first working fluid to the compressor stage and compressing the first working fluid in the compressor stage;
      (ii) establishing a flow of the fuel to the combustion stage and combusting in the combustion stage at least a portion of the fuel with at least a portion of the compressed working fluid's oxidant to produce a heated effluent;
      (iii) expanding the heated effluent in the first expansion stage to produce a decompressed effluent and the first shaft power, wherein the heated effluent is not subjected to an indirect heat transfer with the feed prior to the expanding in this step (c)(iii);
      (iv) transferring heat from the decompressed effluent to the second working fluid in the heat transfer stage to vaporize at least a portion of the second working fluid wherein the decompressed effluent is not subjected to an indirect heat transfer with the feed prior to the transferring in this step (c)(iv);
      (v) expanding at least a portion of the vaporized second working fluid in the second expansion stage to produce the second shaft power; and
   (d) transferring to the process gas compressor at least part of the first shaft power and at least part of the second shaft power to compress at least a portion of the process gas.

2. The process of claim 1, wherein the feed comprises one or more of (i) natural gas, (ii) hydrocarbon in the natural gas, (iii) hydrocarbon separated from the natural gas and/or derived from the natural gas, (iv) natural gas condensate, (v) hydrocarbon in the natural gas condensate, (vi) hydrocarbon separated from the natural gas condensate and/or derived from the natural gas condensate, (vii) crude oil, (viii) hydrocarbon in the crude oil, and (viii) hydrocarbon separated from the crude oil and/or derived from the crude oil.

3. The process of claim 1, wherein the fuel is at least partially gaseous and comprises one or more of (i) natural gas, (ii) hydrocarbon in the natural gas, (iii) hydrocarbon separated from the natural gas and/or derived from the natural gas, (iv) hydrocarbon separated from the natural gas condensate and/or derived from the natural gas condensate, (v) hydrocarbon separated from the crude oil and/or derived from the crude oil, (vi) carbon monoxide, and (vii) molecular hydrogen.

4. The process of claim 1, wherein the first working fluid comprises air and the second working fluid comprises water.

5. The process of claim 1, wherein the flow-through reactor is a reverse-flow thermal pyrolysis reactor.

6. The process of claim 5, wherein the pyrolysis conditions include a temperature in the range of from 773K to 1773K, a total pressure $\geq 34$ kPag, and a hydrocarbon partial pressure of $\geq 48$ kPa.

7. The process of claim 5, further comprising carrying out the pyrolysis of step (b) for a time interval $t_P$, and regenerating the reverse-flow thermal pyrolysis reactor during a time interval $t_R$, wherein $t_P$ and $t_R$ are substantially non-overlapping time intervals.

8. The process of claim 1, wherein the first working fluid is compressed to a pressure $\geq 3$ bar during step (c) (i).

9. The process of claim 1, wherein the second working fluid has a pressure $\geq 10$ bar in the heat transfer stage of step (c) (iv) includes a heat recovery steam generator.

10. The process of claim 1, wherein (i) the heated effluent has a temperature $\geq 1023$K and (ii) the decompressed effluent has a pressure $\leq 2$ bar absolute.

* * * * *